United States Patent
Sahin et al.

(10) Patent No.: US 10,666,555 B2
(45) Date of Patent: May 26, 2020

(54) METHOD AND APPARATUS FOR RELOCATING AND RESTORING CONNECTIONS THROUGH A FAILED SERVING GATEWAY AND TRAFFIC OFFLOADING

(71) Applicant: TELEFONAKTIEBOLAGET LM ERICSSON (PUBL), Stockholm (SE)

(72) Inventors: Yildirim Sahin, Plano, TX (US); Loudon Lee Campbell, Plano, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 30 days.

(21) Appl. No.: 16/249,173

(22) Filed: Jan. 16, 2019

(65) Prior Publication Data
US 2019/0149458 A1 May 16, 2019

Related U.S. Application Data

(63) Continuation of application No. 14/500,672, filed on Sep. 29, 2014, now Pat. No. 10,225,178, which is a (Continued)

(51) Int. Cl.
*H04L 12/703* (2013.01)
*H04W 72/04* (2009.01)
(Continued)

(52) U.S. Cl.
CPC ............ *H04L 45/28* (2013.01); *H04W 36/12* (2013.01); *H04W 40/00* (2013.01);
(Continued)

(58) Field of Classification Search
CPC .. H04L 45/28; H04W 36/0033; H04W 36/12; H04W 40/00; H04W 72/0426; H04W 76/19; H04W 76/22; H04W 76/25
See application file for complete search history.

(56) References Cited

U.S. PATENT DOCUMENTS 6,973,311 B2   12/2005   Yi-Bing et al.
7,457,279 B1   11/2008   Scott et al.
(Continued)

FOREIGN PATENT DOCUMENTS

CN   1798051 A   7/2006
CN   1964249 A   5/2007
(Continued)

OTHER PUBLICATIONS

3rd Generation Partnership Project; Technical Specification Group Core Network and Terminals; Restoration Procedures (Release 10). 3GPP TS 23.007 v10.0.0 (Jun. 2010).
(Continued)

*Primary Examiner* — Asad M Nawaz
*Assistant Examiner* — Thomas R Cairns

(57) ABSTRACT

In a radio telecommunications network, a serving gateway support node controls connections between user equipment nodes and a packet-based network that pass through at least one serving gateway and at least one packet gateway. The serving gateway support node detects that a serving gateway has failed. The serving gateway support node maintains a connection corresponding to the failed serving gateway. The serving gateway support node receives a General Packet Radio Service Tunneling Protocol (GTP) message from the serving gateway, and detects a restart of the serving gateway based on a restart counter value included in the GTP message. After detecting the restart, the serving gateway support node restores the connection to the serving gateway. Related methods, systems, and non-transitory computer-readable media are also disclosed.

12 Claims, 12 Drawing Sheets

Related U.S. Application Data continuation-in-part of application No. 13/005,230, filed on Jan. 12, 2011, now Pat. No. 8,848,516.

(60) Provisional application No. 61/383,116, filed on Sep. 15, 2010.

(51) Int. Cl.
    *H04W 40/00*     (2009.01)
    *H04W 36/12*     (2009.01)
    *H04W 76/19*     (2018.01)
    *H04W 76/25*     (2018.01)
    *H04W 36/00*     (2009.01)
    *H04W 76/22*     (2018.01)

(52) U.S. Cl.
    CPC ....... *H04W 72/0426* (2013.01); *H04W 76/19* (2018.02); *H04W 36/0033* (2013.01); *H04W 76/22* (2018.02); *H04W 76/25* (2018.02)

(56) References Cited

U.S. PATENT DOCUMENTS

| | | | |
|---|---|---|---|
| 7,961,662 B2 | 6/2011 | Hayashi | |
| 8,117,337 B2 | 2/2012 | Liu et al. | |
| 8,200,830 B2 | 6/2012 | Ramankutty | |
| 8,300,602 B2 | 10/2012 | Ramle et al. | |
| 8,472,405 B2 | 6/2013 | Rune | |
| 8,494,529 B2 | 7/2013 | Kim et al. | |
| 8,509,163 B2 | 8/2013 | Guo et al. | |
| 8,520,596 B2 | 8/2013 | Diachina et al. | |
| 8,797,846 B2 | 8/2014 | Olsson et al. | |
| 2003/0128661 A1 | 7/2003 | Weis | |
| 2003/0169712 A1 | 9/2003 | Tsao | |
| 2007/0268855 A1 | 11/2007 | Grayson et al. | |
| 2009/0129342 A1 | 5/2009 | Hwang et al. | |
| 2009/0245236 A1 | 10/2009 | Scott | |
| 2010/0272115 A1 | 10/2010 | Ramankutty | |
| 2011/0075557 A1 | 3/2011 | Chowdhury et al. | |
| 2011/0116449 A1 | 5/2011 | Hu et al. | |
| 2011/0141884 A1 | 6/2011 | Olsson et al. | |

FOREIGN PATENT DOCUMENTS

| | | | | |
|---|---|---|---|---|
| CN | 101243662 A | | 8/2008 | |
| CN | 101426060 A | | 5/2009 | |
| CN | 101616383 A | | 12/2009 | |
| JP | 2005-252510 A | | 9/2005 | |
| JP | 2006-121246 A | | 5/2006 | |
| WO | 2007117461 A2 | | 10/2007 | |
| WO | 2009152861 A1 | | 12/2009 | |
| WO | WO-2011134504 A1 | * | 11/2011 | ............ H04W 76/19 |

OTHER PUBLICATIONS

Research in Motion, A MME Load Re-balancing Handling, 3GPP TSG-SA2 Meeting #77, S2-100414, Shen Zhen China, Jan. 18-22, 2010.

3rd Generation Partnership Project; Technical Specification Group Core Network; Restoration procedures (Release 9). 3GPP TS 23.007 v9.1.0 (Sep. 2009).

Hitachi, et al. Load Re-balancing between GWs, 3GPP TSG SA WG2 Meeting #77, Shen Zhen, China, Jan. 18-22, 2010.

3GPP TS 23.401 V9.5.0, 3rd Generation Partnership Project; Technical Specification Group Services and System Aspects; General Packet Radio Service (GPRS) enhancements for Evolved Universal Terrestrial Radio Access Network (E-UTRAN) access (Release 9), Jun. 10, 2010.

* cited by examiner

METHOD AND APPARATUS FOR RELOCATING AND RESTORING CONNECTIONS THROUGH A FAILED SERVING GATEWAY AND TRAFFIC OFFLOADING

RELATED APPLICATIONS

The present application is a continuation of U.S. patent application Ser. No. 14/500,672 entitled "Methods and Apparatus for Relocating and Restoring Connections Through a Failed Serving Gateway and Traffic Offloading" filed Sep. 29, 2014, now U.S. Pat. No. 10,225,178, which is a continuation in part of U.S. patent application Ser. No. 13/005,230 entitled "Methods and Apparatus for Relocating and Restoring Connections Through a Failed Serving Gateway and Traffic Offloading" filed Jan. 12, 2011, now U.S. Pat. No. 8,848,516, which claims the benefit of priority from U.S. Provisional Application No. 61/383,116 entitled "A Process on Handling of SGW Restart and SGW Traffic Offload" filed Sep. 15, 2010, the disclosures of which are hereby incorporated herein in their entirety by reference.

TECHNICAL FIELD

The present disclosure relates to serving gateway support nodes in radio telecommunications networks, such as, non-exclusively, the serving GPRS support node (SGSN) of a General Packet Radio Service (GPRS) network and the Mobile Management Entity (MME) of a 3GPP (Third Generation Partnership Project) LTE (Long Term Evolution) network. It also relates to serving gateways, packet gateways, networks as a whole, and to related methods.

BACKGROUND

Access for mobile devices to packet-based networks, such as the Internet, through radio telecommunications networks is an important growth area for the telecommunications industry. For example, 3GPP TS (Technical Specification) 23.401 and 3GPP TS 23.060 disclose an Evolved Packet Core (EPC) network architecture in which User Equipment nodes (UEs) connect to a packet-based network through a Serving GateWay (SGW) and a Packet data network GateWay (PGW).

The 3GPP TS 23.007, 3GPP TS 29.274, and 3GPP TS 29.275 specify the following two mechanisms for an EPC node to detect a restart or a failure of a peer EPC node. An EPC node may be, for example, a Mobile Management Entity (MME), a Serving GPRS Support Node with an S4 interface (S4-SGSN), a SGW, and/or a PGW.

According to one mechanism, an EPC node can detect that a peer EPC node has restarted in response to a recovery Information Element (IE) that is received from the other node, such as by a GPRS Tunneling Protocol version 2 (GTPv2) message (e.g. an Echo Response). When the nodes communicate through a Proxy Mobile IP (PMIP)-based S5/S8 interface, one node can signal to the other node that it has restarted by communicating a PMIPv6 Heartbeat Response that contains a restart counter that is incremented each time the node restarts.

According to another mechanism, an EPC node can detect that a peer EPC node has failed responsive to not receiving a reply to a defined number of consecutive GTPv2 Echo Request messages. When the nodes communicate through a PMIP-based S5/S8 interface, one node may conclude that another node (e.g., a SGW or PGW) has failed responsive to not receiving a reply to a defined number of consecutive PMIPv6 Heartbeat Request messages.

However, receiving no replies to GTPv2 Echo Requests or PMIPv6 Heartbeat Request messages from a peer EPC node may not necessarily mean that the peer EPC has restarted or is undergoing a restart procedure. Instead, a node can become unreachable due to some other issues in the network, such as due to temporary transport network failures, routing misconfiguration, etc. Therefore, the 3GPP requirements provide that it is optional for an EPC node to conclude from the absence of replies to GTPv2 Echo Requests or PMIPv6 Heartbeat Request messages from a peer EPC node that the peer node has "failed" or is being "restarted".

In an EPC system, pursuant to 3GPP TS 23.401 and 3GPP TS 23.060, the MME and the S4-SGSN maintain the Mobility Management (MM) context and Evolved Packet System (EPS) bearer context (Packet Data Network (PDN) connection) information. The SGW and the PGW maintain the EPS bearer context information for the UEs that are served by these nodes. Pursuant to 3GPP TS 23.007, when an EPC node restarts, it deletes all affected context information. The EPC nodes, who are peer to the restarted node, detect the restart (and associated deletion of the context information) upon reception of the incremented Restart counter as described above.

3GPP TS 23.007 specifies how the MM context and EPS bearer context information of the UEs is handled by an EPC node when the EPC node detects that one of its peer EPC nodes has restarted. For example, when an MME or a PGW detects that a SGW has restarted, they delete all context information for the UEs that were being served by the restarted SGW. When an S4-SGSN detects that a SGW has restarted, the S4-SGSN deletes all the EPS bearer context information for the UEs that were being served by the restarted SGW, however the S4-SGSN may keep the MM context information for those impacted UEs (i.e., the UEs that are still attached to the network).

While the restart of an EPC node (e.g. SGW) could be due to hardware or software malfunctions in that node, sometimes such a restart could also be initiated intentionally by Operations and Maintenance (O&M) operators during, for example, EPC node upgrades and/or feature activation/deactivation that may require node restart. Regardless of the triggering event for a restart, the affected EPS bearer contexts and MM contexts are handled as described above. 3GPP TS 23.401 specifies a MME load balancing mechanism that allows operators to move UEs associated with a MME to another MME before planned maintenance requiring MME restart. However, there is no such traffic offloading mechanism specified in 3GPP specifications for planned SGW restarts.

Regardless of whether a SGW restart is triggered by hardware or software malfunctions or is operator initiated, whenever a SGW restart occurs the affected MM contexts and the EPS bearer contexts (PDN connections) in the MME, S4-SGSN and PGW are deleted, which can cause severe problems for the associated end-user services and for network signalling. For example, ongoing (i.e. active) packet data sessions are interrupted because of the loss of user plane bearers in the SGW. Ongoing data transfers will not be possible until the UE re-establishes the EPS bearers. End-users will not be able to use any UE-initiated Packet Switched (PS) services until the UEs re-attach and re-establish the associated EPS bearers. Similarly, any network-initiated PS services (e.g. UE-terminated Voice Over Long Term Evolution (LTE) (VoLTE) calls) will not be available to UEs.

Other deleterious effects on the EPC can include a signalling increase on the interfaces between the PGW, MME, and/or S4-SGSN and some other EPC nodes in order to clean up the associated bearers/resources in those other EPC nodes. Increased signalling can also occur on the PGW interfaces, such as, to a Policy and Charging Rules Function (PCRF) (to delete IP-Connectivity Access Network (CAN) sessions), to Remote Authentication Dial in User Service (RADIUS) or Dynamic Host Configuration Protocol (DHCP) servers (e.g. to release IP addresses assigned by these servers), and to charging related servers (e.g. due to closing of Charging Data Records (CDRs)). In addition, some of these servers may also need to talk to some other nodes to do further clean up in the IP Multimedia Subsystem (IMS) core or application servers. For example, a PCRF may inform a Proxy Call Session Control Function (P-CSCF) about the deletion of PDN connection.

In general, the MME/S4-SGSN is configured to avoid unnecessary signalling on the radio interface. As used herein, the term "MME/S4-SGSN" refers to a MME node and/or a S4-SGSN node. However, a SGW restart can cause a sudden increase in the signalling between the MME/S4-SGSN and the UE, between the MME/S4-SGSN and the RAN nodes, and possibly also between the MME and HSS.

End-to-end signalling through the EPC network can also increase during re-connection of the UEs to the network after SGW restarts. Re-connection of the affected UEs (i.e. the UEs who have PDN connections via the restarted SGW) to the network may be spread over time based on the rate of UE-initiated uplink packets, such as Non-Access Stratum (NAS) Service Requests, periodic Routing Area Update (RAU) or Tracking Area Update (TAU) Requests. Some pro-active mechanisms may also be adapted in the MME/S4-SGSN (such as MME-initiated detach signalling to the UE with an indication of re-attach required indication or in SGSN deactivation of PDP contexts with re-activation required indication upon detection of the SGW restart) for faster reconnection of the UEs.

The following procedures may contribute to the end-to-end signalling load during the reconnection of the UEs to the network:

signalling due to rejection of NAS messages (such as Service Request, TAU Request or RAU Request signalling) from the UEs whose MM and/or EPS bearer contexts have been deleted in the network;
  signalling due to re-attach and re-establishment of the PDN connection(s) and any dedicated EPS bearer(s) required by any specific applications in the UEs; and
  re-establishment of the application level signalling between UEs and the application servers, such as for IMS-based services.

If the signalling load upon detection of an SGW restart is not well managed by the PGW, MME, and S4-SGSN, it might lead congestion, overload, and/or instability in the Public Land Mobile Networks (PLMN) where the SGW has active PDN connections.

SUMMARY

Some embodiments are directed to a serving gateway support node that controls connections through at least one serving gateway of a radio telecommunications network. The serving gateway support node detects failure of communications to a first serving gateway. The serving gateway support node responds to the detected failure by initiating relocation of existing connections through the first serving gateway to instead pass through a second serving gateway. The serving gateway support node detects recovery of communications to the first serving gateway, and responds by ceasing relocation of at least some of the existing connections that have not yet been relocated to the second serving gateway.

In some further embodiments, the serving gateway support node responds to the first serving gateway having completed a restart by restoring at least some of the existing connections to the first serving gateway that have not yet been relocated to the second serving gateway. The serving gateway support node may restore at least some of the existing connections to the first serving gateway by communicating context information to the first serving gateway for each of the existing connections that is to be restored to the first serving gateway. The context information may include identification of the connection, an Internet Protocol address of a packet gateway, a tunneling identifier, a Quality of Service value, and/or a bearer ID.

Some other embodiments are directed to a method for controlling connections that pass through at least one serving gateway of a radio telecommunications network. Failure of communications to a first serving gateway is detected. In response to the detected failure, a serving gateway support node initiates relocation of existing connections through the first serving gateway to instead pass through a second serving gateway. Recovery of communications to the first serving gateway is detected. In response to the detected recovery, the serving gateway support node ceases relocation of at least some of the existing connections that have not yet been relocated to pass through the second serving gateway.

Some other embodiments are directed to a method for controlling connections that pass through at least one serving gateway of a radio telecommunications network. A serving gateway support node receives a first message from an operator requesting that at least some existing connections be offloaded from a first serving gateway. In response to the first message, the serving gateway support node relocates at least some of the existing connections from the first serving gateway to a second serving gateway.

Some other embodiments are directed to a serving gateway that receives a connection restoration message from a serving gateway support node after the serving gateway has restarted. The serving gateway responds to the connection restoration message by restoring in memory of the serving gateway at least some connections, which existed before the serving gateway restarted, between user equipment nodes and a packet-based network that passed through the serving gateway.

Some other embodiments are directed to a packet gateway that determines whether a serving gateway support node supports a connection relocation mode through which the serving gateway support node relocates connections from a first serving gateway of a radio telecommunications network to a second serving gateway in response to the serving gateway support node detecting failure of communications to the first serving gateway. The packet gateway detects failure of communications to the first serving gateway. The packet gateway responds to the detected failure and a determination that the serving gateway support node supports the connection relocation mode by retaining in a memory of the packet gateway context information for any connections that the packet gateway has that pass through the first serving gateway. The packet gateway responds to the detected failure and a determination that the serving gateway support node does not support the connection relocation mode by deleting from the memory of the packet gateway the context information for any connections that the packet gateway has that pass through the first serving gateway.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Some embodiments are directed to a radio telecommunications network in which a serving gateway support node controls connections between UEs and a packet-based network that pass through at least one SGW and at least one PGW. The serving gateway support node responds to an indication of failure of communications to a first SGW, or to an operator initiated offloading of connections from the SGW, by starting relocation of existing connections that pass through the first SGW to instead pass through a second SGW. The serving gateway support node also responds to an indication of recovery of communications to the first SGW, or to cessation of the operator initiated offloading of connections from the SGW, by ceasing relocation of at least some of the existing connections that have not yet been relocated to pass through the second SGW.

The serving gateway support node may also respond to an indication that the first SGW has restarted, which resulted in the first SGW losing information on at least some of the existing connections, by restoring at least some of the existing connections to the first SGW that have not yet been relocated to pass through the second SGW. The serving gateway support node may restore at least some of the existing connections to the first serving gateway by communicating context information to the first serving gateway for each of the existing connections that is to be restored to the first serving gateway. These and other embodiments are explained below with regard to FIGS. 1-18.

Figure 1:
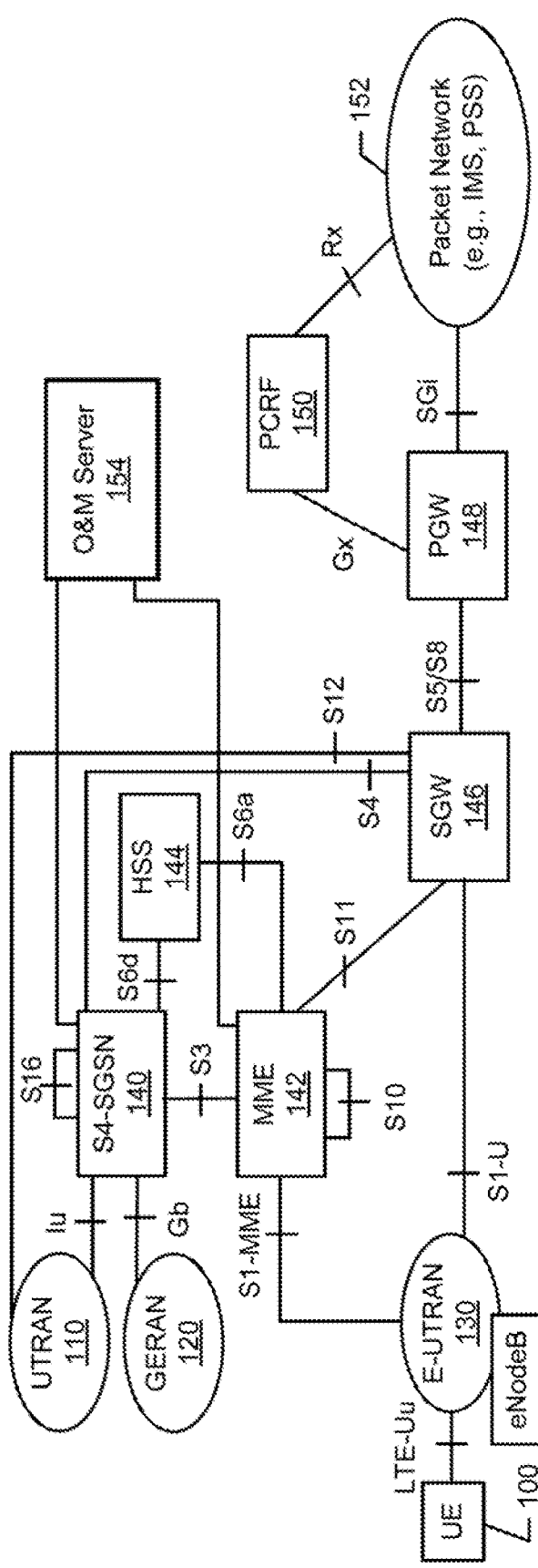
FIG. 1 is a block diagram of a radio telecommunications network that is configured to operate according to some embodiments.

Example Radio Telecommunications Network:

FIG. 1 is a block diagram of an example Third Generation Partnership Project (3GPP) radio telecommunications network that is configured to operate according to some embodiments. The radio telecommunications network comprises a plurality, typically thousands, of user equipment nodes 100 (also known as wireless terminals or mobile stations) that communicate through radio access communication links with a Universal Mobile Telecommunications System (UMTS) Terrestrial Radio Access Network (UTRAN) 110, a GSM EDGE Radio Access Network (GERAN) 120, and/or an Evolved Universal Terrestrial Radio Access Network (E-UTRAN) 130.

The UTRAN 110 and the GERAN 120 can each include radio network controller (RNC) nodes to control communications through radio base stations providing radio access communication links to UEs that are within their respective communication service cells. The E-UTRAN 130 can include radio base station nodes (eNodeBs 132) that can provide the combined functionality of the RNC nodes and base stations of the UTRAN 110 and the GERAN 120.

A plurality of S4-SGSNs 140 (one of which is shown in FIG. 1) are responsible for the delivery of data packets from and to the UEs 100 within its geographical service area. Their tasks can include packet routing and transfer, mobility management (attach/detach and location management), logical link management, and authentication functions. The S4-SGSNs 140 control communications connections between UEs and one or more packet-based networks 152 through a plurality of SGWs 146 (one of which is shown in FIG. 1) and PGWs 148 (one of which is shown in FIG. 1), and may perform other functions such as mobility management as PMM-IDLE/Standby mode UEs 100 moves from one Routing Area to another Routing Area. The S4-SGSN 140 can establish connections at the SGWs 146 through a S4 interface. The packet-based network 152 may include the Internet and/or other packet network elements. The S4-SGSN also provides control plane functionality for carrying out mobility between 2G/3G and LTE access networks with the S3 interface between the MMEs 142 and the S4-SGSNs 140.

The SGWs 146 route and forward signalling and user data packets, while also acting as the mobility anchor for the user plane during inter-base station/eNodeB handovers and as the anchor for mobility between the UTRAN 110, the GERAN 120, and the E-UTRAN 130. For a ECM-IDLE/PMM-IDLE/Standby mode UE 100, a SGW 146 may terminate the downlink data path and triggers paging when downlink data arrives for the UE 100. The SGWs 146 manage and store UE communication connection contexts, which for each connection can include identification of the connection, an Internet Protocol address of a packet gateway, a tunneling identifier, and a Quality of Service value.

The PGWs 148 provide entry and exit points to the packet network 152 for UE traffic flowing through the SGWs 146. A UE 100 may have simultaneous connectivity with more than one PGW 148 for accessing multiple packet networks 152. The PGWs 148 perform policy enforcement, packet filtering for each UE 100, charging support, lawful interception and packet screening. The PGWs 148 also function as the anchor for mobility between 3GPP and non-3GPP technologies such as WiMAX and 3GPP2 (CDMA 1× and EvDO).

MMEs 142 (one of which is shown in FIG. 1) route and forward signalling packets for the E-UTRAN 130. The MMEs 142 are responsible for EPS Connection Management (ECM) idle mode UE 100 tracking and paging procedures, and are involved in connection bearer (Packet Data Network (PDN) connection) activation/deactivation processes and are also responsible for choosing the SGW 146 for a UE 100 at the initial attachment and at time of handover. Non-Access Stratum (NAS) signalling terminates at the MMEs 142, and they are also responsible for generation and allocation of temporary identities to UEs 100. It checks the authorization of a UE 100 to camp on a service provider's Public Land Mobile Network and enforces UE roaming restrictions. The MMEs 142 are the termination point in the network for ciphering/integrity protection for NAS signalling and handles security key management. The MME also provides control plane functionality for carrying out mobility between LTE and 2G/3G access networks with the S3 interface between the MMEs 142 and the S4-SGSNs 140.

For ease of explanation, a S4-SGSN 140 and a MME 142 are also sometimes collectively or individually referred to herein as a "serving gateway support node" and "MME/S4-SGSN 142,140." Accordingly, the serving gateway support node can include the S4-SGSNs 140 only, the MMEs 142 only, or a combination of the S4-SGSNs 140 and the MMEs 142.

An operations and maintenance (O&M) server 154 can be used to control various operations of the S4-SGSN 140 and MME 142 as described below.

The S4-SGSN 140 and MME 142 access a Home Subscriber Server (HSS) 144, via respective S6d and S6a interfaces, to obtain UE subscription-related information (subscriber profiles), and perform authentication and authorization of UEs 100. A policy charging and rules function (PCRF) node 150 applies policy rules to control what services are allowed and to control the quality of service (QoS) levels that are provided to user packet traffic flowing through the PGW 148 and packet network 152, and also aggregates information for use by charging nodes and other network nodes.

Figure 2:
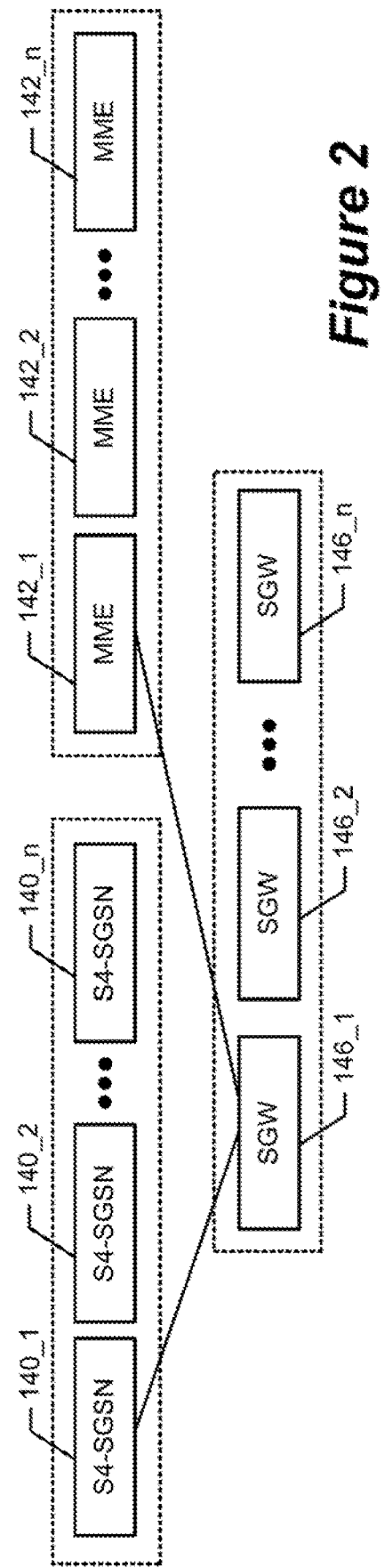
FIG. 2 illustrates a plurality of S4-SGSNs and MMEs that operate to control connections between UEs and a packet-based network that pass through various SGWs according to some embodiments.

Serving Gateway Support Node and PGW Response to SGW Restart:

FIG. 2 illustrates a plurality of the S4-SGSNs 140_1 to 140_n and MMEs 142_1 to 142_n that operate to control connections between UEs 100 within their respective geographic service areas and the packet network 152 that pass through a plurality of the SGWs 146_1 to 146_n, where the number "n" of S4-SGSNs, MMEs, and SGWs may be different.

At least some of the problems that result from restart of a SGW 146, described above, may be reduced if the MMEs/S4-SGSNs 142,140 and PGWs 148, who have PDN connections established via the restarted SGW 146, are synchronized (e.g. by static configuration and/or some GTPv2 signalling) to handle the affected bearer contexts (PDN connections) so that: 1) the MMEs/S4-SGSNs 142,140 and PGWs 148 do not delete the contexts upon detection of the SGW restart; and 2) the MMEs/S4-SGSNs 142,140 are configured to initiate SGW relocation procedures to move the contexts of the affected UEs 100 to other SGWs 146 (who serve the same area as the restarted SGW 146) and/or to control restoration of the contexts to the restarted SGW 146 after its recovery.

In accordance with various embodiments of the present invention, a serving gateway support node (S4-SGSN/MME 140,142) is configured to respond to a detected failure of communications to a first SGW 146_1 by initiating relocation of existing connections through the first SGW 146_1 to instead pass through a second SGW 146_2. The serving gateway support node (S4-SGSN/MME 140,142) also responds to a detected recovery of communications to the first SGW 146_1 by ceasing relocation of at least some of the existing connections that have not yet been relocated to the second SGW 146_2. The serving gateway support node (S4-SGSN/MME 140,142) may also respond to the first SGW 146_1 having completed a restart by restoring at least some of the existing connections to the first SGW 146_1 that have not yet been relocated to the second SGW 146_2.

The SGW relocation procedure can use an intra MME/S4-SGSN 142,140 inter SGW 146 (i.e. intra MME inter SGW TAU or intra S4-SGSN inter SGW RAU) signalling for the UEs 100 operating with the E-UTRAN 130 or UTRAN/GERAN 110,120, respectively. If an affected UE 100 has PDN connections in multiple PGWs 148 and only some of the PGWs 148 and the MME/S4-SGSN 142,140 support relocation and restoration of PDN connection contexts following SGW restart, the MME/S4-SGSN 142,140 relocations and/or restores only the PDN connections established in the PGWs 148 that support relocation and restoration of PDN connection contexts. The other PDN connections in the MME/S4-SGSN 142,140 and the other PGWs 148 are locally deleted.

In order to restore the bearer (PDN connections) contexts to the restarted SGW 146, the MME/S4-SGSN 142,140 responds to a detected failure of communications to the SGW 146 by repetitively checking the recovery/accessibility of the SGW 146 by sending periodic GTPv2 Echo Request signalling on the S11/S4 interface. In response to determining that the SGW 146 has restarted, by observing an incremented Restart counter value in a GTPv2 Echo Response from the SGW 146, the MME/S4-SGSN 142,140 can start restoring the bearer contexts (PDN connections) to the SGW 146. When the SGW 146 restarted, it lost the PDN connections and, therefore, the MME/S4-SGSN 142,140 can communicate context information to the restarted SGW 146 for each of the connections restore those connections at the SGW 146. The MME/S4-SGSN 142,140 may communicate context information in GTPv2 Create Session Request messages on S11/S4 with the information elements (IEs) that are used for SGW relocation mobility as specified in 3GPP TS 29.274. In some embodiments, the MME/S4-SGSN 142,140 can communicate for each PDN connection to be restored context information that includes identification of the PDN connection, an Internet Protocol address of a packet gateway, a tunneling identifier, and/or a Quality of Service value. In response to receiving the GTPv2 Create Session Request message, the SGW 146 may send a GTPv2 Modify Bearer Request or a PMIPv6 Proxy Binding Update message on S5/S8 with IEs that are used for SGW relocation mobility as specified in 3GPP TS 29.274 and 3GPP TS 29.275.

Before detecting that the SGW 146 has restarted, responsive to receipt of an incremented Restart Counter value, the MME/S4-SGSN 142,140 may detect a failure of communications with the SGW 146 for a threshold time. The MME/S4-SGSN 142,140 may respond to the detected failure by initiating relocation of PDN connections passing through the SGW 146 for the UEs 100. The MME/S4-SGSN 142,140 may be informed about failed communications with the SGW 146 from the UEs 100, who may observe radio bearer release on S12 and S1-U due to unreachability of the SGW 146 and/or who may unsuccessfully try to establish radio bearers to send uplink packet(s), and/or who may be in the process of performing mobility procedures (RAU/TAU/HO). If the SGW 146 remains unavailable due to, for example, restart, failure, or planned maintenance more than a threshold time, an operator may use the centralized O&M server 154 to inform the MME/S4-SGSN 142,140 of the SGW 146 unavailability and instruct each MME/S4-SGSN 142,140 to initiate relocation of the affected PDN connections to other SGWs 146.

When the SGW 146 restarts, almost all affected UEs 100, which are in data ECM-CONNECTED/PMM-CONNECTED/GPRS READY state, may be expected to move to ECM-IDLE/PMM-IDLE/GPRS STANDBY state depending on the Radio Access Technology (RAT) (e.g., E-UTRAN 130, GERAN 120, UTRAN 110, etc.) that the UEs 100 are currently located on. The MME/S4-SGSN 142,140 can initiate the intra MME/S4-SGSN inter SGW relocation procedure for an affected UE 100 without waiting for receipt of an uplink NAS message (e.g. Service Request, periodic TAU Request, and periodic RAU Request). In addition, in many situations, the SGW relocation signalling for the affected UE 100 can be completed within the packet core network without involving any signalling between the MME/S4-SGSN 142,140 and the UE 100. The signalling flow for the SGW relocation within the packet core network may be the same as what has been specified in the corresponding 3GPP specifications TS 23.401 and TS 23.060. For example, in E-UTRAN for GTP-based S5/S8, the message flow corresponds to Messages 301 to 305 (described further below) shown in FIG. 3, which illustrates a diagram of operations, methods and associated message flows between various elements of the radio telecommunications network of FIG. 1 for forming connections responsive to a UE triggered service request procedure in E-UTRAN and relocating connections according to some embodiments. In some situations, as required by the 3GPP specifications, signalling towards the UE 100 might become necessary, for example, because of a change of authorized QoS of a bearer (PDN connection) as a result of the SGW relocation procedure.

For UEs 100 that are in a RRC-CONNECTED state, the MME/S4-SGSN 142,140 may move those UEs 100 to a RRC-IDLE state by sending S1-AP UE-CONTEXT-RELEASE-COMMANDs (pursuant to 3GPP TS 36.413) or a IU-RELEASE-COMMANDs (pursuant to 3GPP TS 25.413) to the eNodeB 132 of the E-UTRAN 130 and/or the RNC of the UTRAN 110 and/or GERAN 120 before performing the SGW relocation procedure. Optionally, a S1-RESET may be sent to the impacted UEs 100, which may provide improved efficiency.

Figure 3:
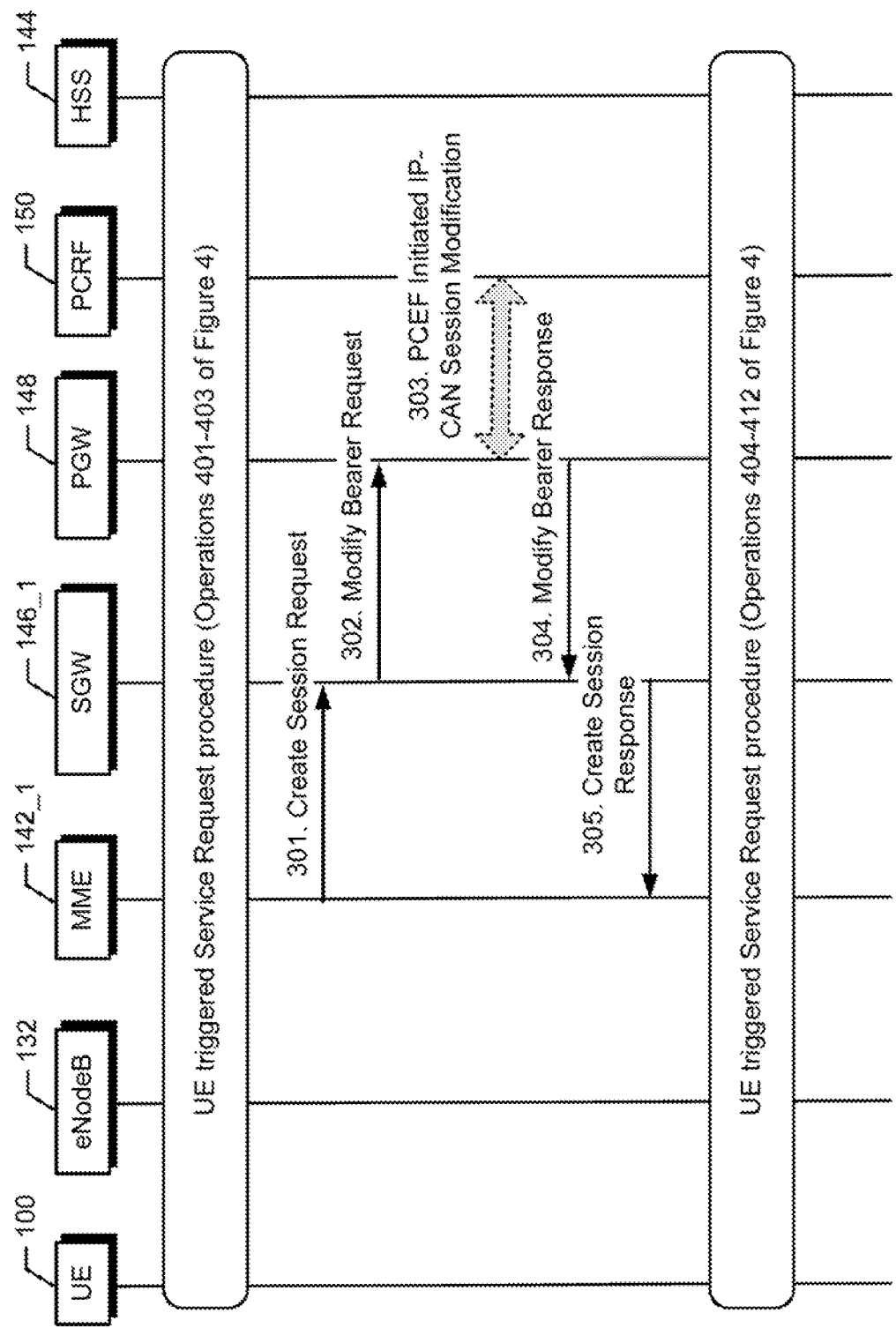
FIG. 3 illustrates a diagram of operations, methods and associated message flows between various elements of the radio telecommunications network of FIG. 1 for forming connections responsive to a UE triggered service request procedure and for relocating connections according to some embodiments.

In response to receiving uplink NAS signalling from an affected UE 100, for which the MME/S4-SGSN 142,140 has not yet started the SGW relocation, the MME/S4-SGSN 142,140 can be configured to prioritize relocation of a PDN connection for that UE 100 from the affected SGW 146 to another SGW 146 as part of the UE-initiated signalling. For example, FIG. 3 depicts the UE triggered Service Request signalling flow with additional GTP-based S5/S8 signalling to carry-out relocation of a SGW PDN connection for a UE that is connected through the E-UTRAN 130. In FIG. 3, the SGW can be either the SGW 146_1 that has recovered from the restart or another SGW 146_2 that has connectivity to both the MME 142 and the PGW 148. The additional signalling messages due to the recovery of the PDN connection are depicted as Messages 301 to 305.

The MME 142_1 responds to a determination that the SGW 146_1 has restarted by restoring the PDN connection for the UE 100 back to the SGW 146_1. In the exemplary embodiment, the MME 142_1 may communicate a Create Session Request message 301 to the SGW 146_1, which responds by communicating a Modify Bearer Request 302 to the PGW 148. The PGW 148 may then exchange messaging 303 with the PCRF 150 to carryout policy and charging enforcement functions (PCEF) initiated by an IP Connectivity Access Network (IP-CAN) session modification. The PGW 148 may communicate a Modify Bearer Response message 304 to the SGW 146_1, which, in turn, communicates a Create Session Response message 305 to the MME 142_1.

Note that the IEs carried in Messages 301 to 305 may be the same as the IEs carried in SGW relocation procedures specified in the 3GPP specifications for the relevant interfaces. Messages 301 to 305 may also contain the IEs (discussed below), which are associated with embodiments of the SGW restart handling operations and methods. The signalling between the PGW 148 and the PCRF 150 may not be necessary when the PDN connections have been restored to the same SGW 146_1 which restarted. The PGW 148 can determine whether such signalling to the PCRF 150 is necessary based on the information received in the GTPv2 Modify Bearer Request message from the SGW 146_1.

Figure 4:
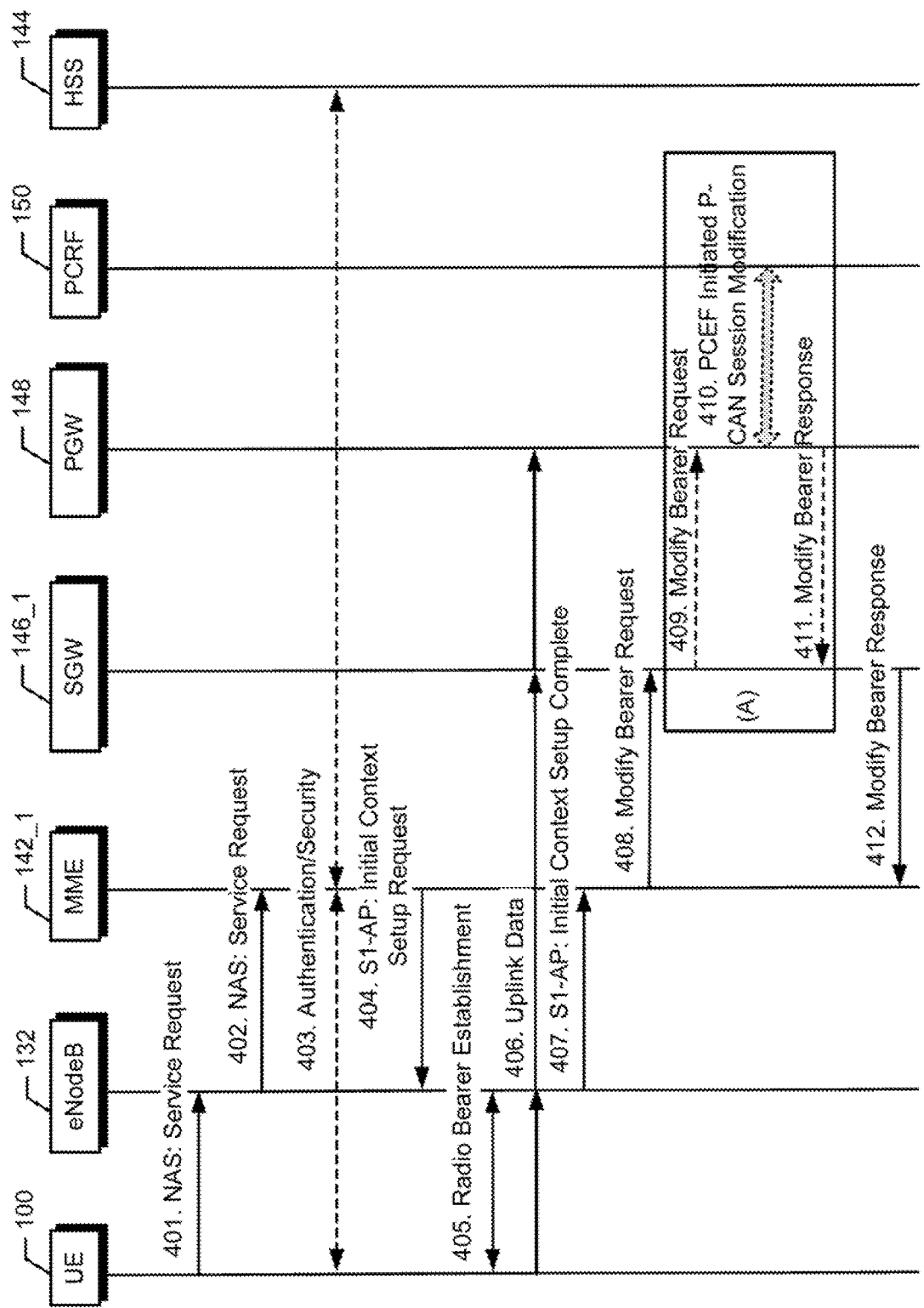
FIG. 4 illustrates a diagram of further operations, methods and associated message flows relating to FIG. 3 for forming connections responsive to a UE triggered service request procedure.

FIG. 4 illustrates a diagram of further operations, methods and associated message flows relating to FIG. 3 to setup PDN connections for a UE 100 responsive to a UE triggered service request, which may operate at least in part based on 3GPP TS 23.401. Referring to FIG. 4, a UE 100 communicates a NAS Service Request message 401 towards the MME 142_1 encapsulated in an RRC message to the eNodeB 132, which forwarded as message 402 to the MME 142_1. In response, the UE 100 may be authenticated and communication encryption may be enabled by further messaging 403.

The MME 142_1 communicates a S1-AP Initial Context of the Request message 404 (which can include the SGW address, EPS bearer quality of service, etc.) to the eNodeB 132. The eNodeB 132 then performs the radio bearer establishment procedure 405. The user plane security is established and the user plane radio bearers are setup. The UE 100 may then communicate uplink data 406 to the eNodeB 132 for relay through the SGW 146_1 and PGW 148 to the packet network 152 (FIG. 1). The eNodeB 132 communicates a S1-AP Initial Context Setup Complete message 407 to the MME 142_1 confirming that the context has been successfully established. The MME 142_1 responds by communicating a Modify Bearer Request message 408 to the SGW 146_1. The SGW 146_1 is now able to transmit downlink data towards the UE 100.

A Modify Bearer Request 409 can be sent from the SGW 146_1 to the PGW 148. The PGW 148 may exchange signalling 410 with the PCRF 150 to obtain updated QoS information for the PDN connection. The PGW 148 communicates a responsive Modify Bearer Response message 411 to the SGW 146_1, which communicates a Modify Bearer Response message of 412 to the MME 142_1.

For the UEs 100 that are on the move to the service area of another MME/S4-SGSN 142,140 during the detection or the recovery of the restarting SGW 146_1, inter-MME/SGSN inter-SGW mobility signalling should be performed. In this case, for the TAU/RAU mobility one of the two following options could be adapted for the mobility signalling:

Option 1—The source MME/S4-SGSN 142,140 may relocate the existing connections that is associated with a UE 100 that is to be handed off to a target MME/S4-SGSN 142,140 by communicating a handover message on S3/S10/S16 interface to the other target MME/S4-SGSN 142,140 that identifies a fake SGW that is known by the source MME/S4-SGSN 142,140 to not exist so that the target MME/S4-SGSN 142,140 will, after identifying that the fake SGW does not exist, select another SGW (e.g., SGW 146_n) from among a group of SGWs 146 that it knows exists and will relocate the existing connections to pass through the selected SGW. By way of a particular example, the source MME/S4-SGSN 142,140 can inform the target MME/S4-SGSN 142,140 in the GTPv2 Context Response (3GPP TS 29.274) message that the SGW 146_1, which currently has bearer contexts of UEs 100, either is not reachable or has just recovered from a restart (i.e. the SGW 146_1 no longer contains the UE bearer contexts). Upon reception of such an indication by the target MME/S4-SGSN 142,140, it performs either an SGW relocation (relocation of PDN connections that were passing through SGW 146_1) to a new SGW (e.g., SGW 146_2) (which is not the one communicated in the Context Response) or an SGW back to the now restarted SGW 146_1 (restoration of at least some of the PDN connections, which passed through SGW 146_1 before the restart, back to SGW 146_1). In some embodiments, the source MME/S4-SGSN 142,140 provides a fake (i.e. invalid in DNS) SGW Fully Qualified Domain Name (FQDN) for the SGW and optionally an invalid S11/S4 SGW Fully Qualified Temporary Endpoint Identifier (F-TEID) for the SGW. Fake FQDN (and optionally an invalid SGW F-TEID) is a one type of indicator that the source MME/S4-SGSN 142, 140 may use towards the target MME/S4-SGSN 142, 140 that SGW relocation signalling needs to be performed. Alternatively, the target MME/S4-SGSN 142,140 may be informed by the source MME/S4-SGSN 142, 140 through another type of indicator that relocation of PDN connections is needed.

Option 2—The source MME/S4-SGSN 142,140 can perform the SGW relocation before sending the GTPv2 Context Response message to the target MME/S4-SGSN 142,140. The GTPv2 Context Response message would then contain the identities of the newly allocated SGW 146.

The first option may result in less signalling than the second option. However, if the target MME/S4-SGSN 142, 140 does not support relocation of PDN connections following SGW restart, the second option may then be preferable. When the target MME/S4-SGSN 142,140 supports the relocation of PDN connections following SGW restart, the target MME/S4-SGSN 142,140 may indicate its support level for the feature in the GTPv2 Context Request (3GPP TS 29.274) message to the source MME/S4-SGSN 142,140 so that the source MME/S4-SGSN 142,140 can select between the two options for SGW relocation.

For UEs 100 that are in the process of handover (HO) signalling, the relocation/restoration procedure can vary depending upon what stage of HO signalling was occurring when the SGW failure was observed. For example, the HO may fail and the UE 100 may go to ECM-IDLE/PMM-IDLE/STANDBY state and then may perform RAU/TAU signalling. Alternatively, the HO signalling with SGW relocation may occur but data forwarding may not be possible due to SGW failure. In this case, if MME/S4-SGSN 142,140 relocation is required due to HO, the source MME/S4-SGSN 142,140 may inform the target MME/S4-SGSN 142,140 to perform SGW relocation due to unreachability of the SGW 146. One such approach may include for the source MME/S4-SGSN 142,140 to provide a fake (i.e. invalid in DNS) SGW FQDN and optionally an invalid S11/S4 SGW F-TEID. Alternatively, the target MME/S4-SGSN 142,140 may be informed by the source MME/S4-SGSN 142, 140 through other form of indicator in the S10/S3/S16 GTP messaging that relocation of PDN connections is needed.

Note that in early stages of the SGW restart where the MMEs/S4-SGSNs 142,140 have not received the incremented Restart Counter value of the SGW 146 yet and a RAU/TAU/HO signalling for a UE 100 has started, if the target MME/S4-SGSN 142,140 decides to re-use the SGW 146 provided in the UE context information received from the source MME/S4-SGSN 142,140 and it also detects that the SGW146 is not reachable, the target MME/S4-SGSN 142,140 should reselect an alternative SGW 146 for successful RAU/TAU/HO procedure. This mechanism could still lead successful TAU/RAU/HO signalling even if the target and/or source MME/S4-SGSN 142,140 does not support the optimized SGW restart handling and if the PGW 148 has not deleted the active PDN connections due to the SGW restart yet.

For UEs 100 who are on the move to a Gn/Gp-SGSN, unavailability of the SGW 146 will not be visible to the target Gn/Gp-SGSN at such mobility because no SGW 146 is in use with Gn/Gp-SGSNs.

For UEs 100 in ISR activated mode there would be context information in both an MME 142 and an S4-SGSN 140. One of the two following options may be performed by those UEs 100 to handle SGW relocation without change of MME and S4-SGSN, where ISR is active:

Option 1: Deactivation of ISR in the UE—If the UE 100 does a TAU/RAU while ISR is activated, the procedures for SGW relocation described above may be carried out with the current access. The UE 100 is informed that ISR is deactivated in the TAU/RAU Accept message. After the TAU/RAU procedure is completed, optionally a new S3 message could be sent to the other node (i.e. SGSN 140 or MME 142) to inform that ISR is deactivated.

Option 2: Maintain the ISR activation—If the UE 100 does a TAU/RAU/HO or a Service Request, the procedures for SGW relocation above work in the current access. A new S3 message carrying the new SGW's FQDN and the S4/S11 SGW F-TEID information is sent from the MME 142 to the S4-SGSN 140, or vice versa, after the GTPv2 Create Session Response is received. The S4-SGSN 140 (or MME 142) sends a GTPv2 Modify Bearer Request message to the SGW activating ISR, such as based on Step 9 of Section 5.3.3.2 of TS 23.401 or Step 7 of Section 5.3.3.3 of TS 23.401.

Operator Initiated Offloading of SGW Traffic:

In some further embodiments, an operator can initiate SGW relocation to offload traffic from a SGW 146, such as by operation of the O&M server 154.

The idea of the MME/S4-SGSN 142,140 performing SGW relocation upon detection of an SGW restart can be extended to offload traffic (i.e. PDN connections) on a specific SGW 146, i.e. moving the PDN connections of some or all UEs 100 to other SGWs 146 in the same service area. The reason for performing traffic offload for a SGW 146 might be due to a planned SGW maintenance that causes a SGW to restart or have traffic outage for a relatively long period of time. In some situations, the operator may want to perform traffic offload on a SGW 146 such as offloading a percentage of UEs 100 having PDN connections via a specific SGW 146 or offloading the UEs 100 that have active PDN connections on a specific APN or offloading the UEs 100 that belong to certain PLMN, etc. For these cases, all or some of the MMEs/S4-SGSNs 142,140 can be instructed via their O&M interfaces or via the centralized O&M server 154 to perform SGW relocation for the UEs 100 that fall into the criteria for the SGW traffic offload. The instructions to the MMEs/S4-SGSNs 142,140 can contain the node FQDN and/or the S11/S4 GTPv2-C Tunnel IP addresses of the SGW that the traffic offload would be executed, and optionally the completion time/duration to offload the traffic and/or the time or duration after when the MME/S4-SGSN 142,140 may start reselecting the SGW for new traffic. If some other criteria are chosen for the traffic offload on a SGW 146, relevant parameters should be provided to the MMEs/S4-SGSNs 142,140. For example, to move the UEs 100 that have active PDN connections on a specific APN, the APN information need to be included in the instructions.

Once the MME/S4-SGSN 142,140 gets the instruction for SGW traffic offload, it throttles the SGW relocation procedures. The MME/S4-SGSN 142,140 chooses the proper SGW 146 for SGW relocation for each impacted UE 100 by using the existing DNS procedures in 3GPP TS 29.303. Offloading all traffic in the SGW 146 could be accomplished by removing the SGW records under the TAI/RAI FQDNs in the DNS. Note that it will take DNS Time-To-Live timer setting of the record, before it propagates to the MME/S4-SGSN 142,140. Therefore, clearing the cache on MMEs/S4-SGSNs 142,140 could be considered.

For the UEs 100 in ECM-IDLE/PMM-IDLE/GPRS STANDBY state, the MME/S4-SGSN 142,140 performs intra-MME inter-SGW TAU or intra-S4-SGSN inter-SGW RAU procedures. For the UEs 100 that are not in ECM-IDLE/PMM-IDLE/GPRS STANDBY state, the MME/S4-SGSN 142,140 may either wait for them to go to one of those states depending on the radio access, or it may force the UEs 100 to go to such states before performing SGW relocation procedures.

For UEs 100 that are in TAU/RAU/HO procedures, the target MME/S4-SGSN 142,140 may take necessary actions to perform SGW relocation (as per the SGW relocation signalling specified in 3GPP TS 23.401 and 3GPP TS 23.060) if those UEs 100 fall into the criteria for SGW traffic offload.

The MMEs/S4-SGSNs 142,140 that were instructed to fully offload an SGW 146, should not reselect that SGW 146 for any new UEs 100 for the duration instructed. If the duration of the SGW maintenance takes longer than planned, new instructions can be sent to the MMEs/S4-SGSNs 142, 140 to inform them when the SGW 146 would become available. This could be accomplished by proper configuration of the DNS server(s) for the SGW resolution e.g. by removing the SGW FQDN from the DNS server(s).

Each MME/S4-SGSN 142,140 that has been instructed to offload the traffic (i.e. PDN connections) on an SGW 146, should be able to provide relevant statistical information such as percent UEs offloaded, when requested. The MME/S4-SGSN 142,140 may also inform the O&M server 154 when the offload has been completed (e.g. by logging a relevant event message).

For the case of ISR activated UEs 100 that perform TAU or RAU, the above procedure works for operator initiated SGW relocation may be performed. When the traffic to be offloaded includes UEs that never perform TAU/RAU, ISR activation may be maintained in the network as follows: when the UE 100 does a HO without connected mode TAU, the above operations and procedures for SGW relocation may be performed. If the UE 100 does a Service Request the MME/S4-SGSN 142,140 can perform the same procedures to core network as a TAU/RAU with SGW change then it does the service request (e.g. similar to the handling of the service request procedure in FIG. 3). Note since the UE 100 cannot be informed that ISR is deactivation due to SGW relocation, an S3 message carrying the new SGW's FQDN and the S4/S11 SGW F-TEID information can be sent from the MME 142 to the S4-SGSN 140, or vice versa (depending on whether the MME 142 or S4-SGSN 140 sent the S3 message), after the GTPv2 Create Session Response is received. The S4-SGSN 140 (or the MME 142) can then send a GTPv2 Modify Bearer Request message to the SGW 146 activating ISR based on Step 9 of Section 5.3.3.2 of 3GPP TS 23.401 or Step 7 of Section 5.3.3.3 of 3GPP TS 23.401.

Figure 5:
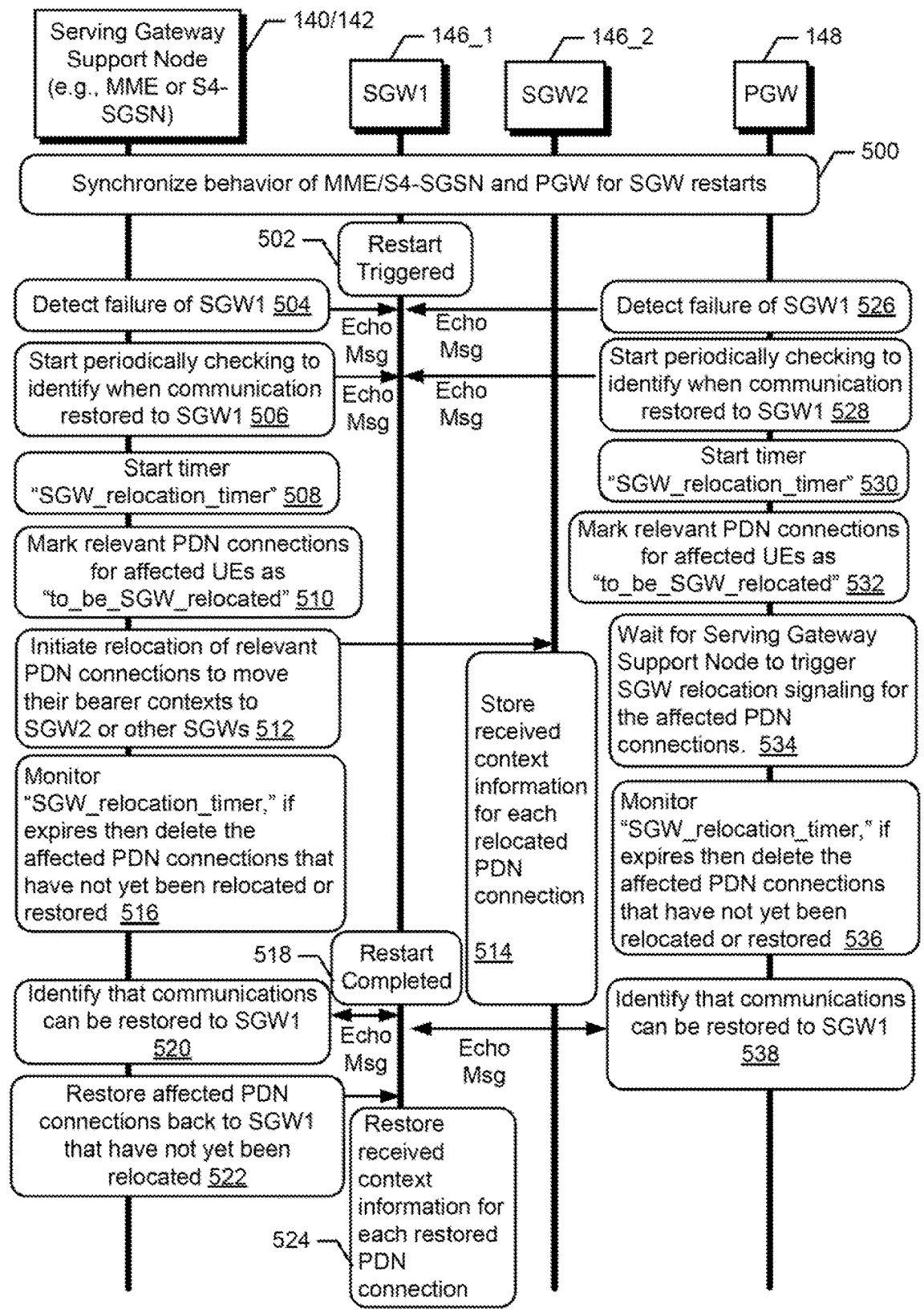
FIG. 5 illustrates a diagram of operations, methods and associated message flows between a serving gateway support node, first and second SGWs, and a PGW for relocating and storing connections responsive to one of the SGWs restarting and/or operating initiated traffic offloading in accordance with some embodiments.

Relocation and Restoration of Connections Responsive to SGW Restart:

FIG. 5 illustrates a diagram of operations, methods and associated message flows between a serving gateway support node (e.g., MME/S4-SGSN 142,140), first and second SGWs 146_1 and 146_2, and a PGW 148 that occur to relocate some PDN connections and restore other PDN connections responsive to one of the SGWs 146_1 restarting and/or responsive to a message from an operator. Referring to FIG. 5, SGW1 146_1 represents the SGW that experiences a restart and SGW2 146_2 represents another one of the SGWs 146 that is connected to both the MME/S4-SGSN 142,140 and the PGW 148. In a typical deployment it is expected that there would be more than one SGW 146 connected to a MME/S4-SGSN 142,140 and a PGW 148.

Although various operations are described below for relocating some PDN connections from SGW1 to SGW2 and restoring other PDN connections back to SGW1 in the context of being initiated in response to detecting that SGW1 is undergoing a restart operation, the relocation and restoration operations may alternatively or additionally be initiated by an operator (e.g., via the O&M Server 154) communicating messages to MME/S4-SGSN 142,140 and the PGW 148 offload connections from SGW1, such as a response by the operator from observing that SGW1 is undergoing lengthy restart operations.

In block 500, the MME/S4-SGSN 142,140 and the PGW 148 perform communication to synchronize how they will respond to any SGWs restarts. For example, the MME/S4-SGSN 142,140 and the PGW 148 can identify to each other that they support relocation of PDN connections when communication with a SGW (SGW1) fails (e.g., due to restart). The MME/S4-SGSN 142,140 may, for example, signal the PGW 148 to not delete certain identified UE PDN connections upon detecting that an identified serving SGW (SGW1) has restarted, and so that those PDN connections can continue to be used after the MME/S4-SGSN 142,140 as relocated at least some of the PDN connections to another SGW (SGW2) and/or has restored at least some of the PDN connections back to a restart SGW. Alternatively or additionally, the MME/S4-SGSN 142,140 may communicate signals to SGW1 informing it to not report to the PGW 148 when it has restarted in order to avoid the PGW 148 deleting PDN connections that are being relocated to SGW2 and/or being restored back to SGW1.

Such synchronization communications between the MME/S4-SGSN and the PGW can include one of the following four options:

Option 1: PDN connection level capability exchange— The MMEs/S4-SGSNs 142,140 and PGWs 148 can exchange their capabilities to support the PDN connection relocation procedures following SGW restart. The information may be stored as part of context information for each PDN connection and may be sent to the target MME/S4-SGSN 142,140 during RAU/TAU/HO procedures at MME/S4-SGSN relocation. During MME/S4-SGSN relocations, such a capability exchange between the new MME/S4-SGSN 142,140 and the PGW 148 should take place unless all the nodes involved (i.e. source MME/S4-SGSN 142,140, target MME/S4-SGSN 142,140 and PGW 148) support the feature. This method of PDN connection level feature capability exchange may also require support in SGWs 146 (and possibly the PCRF 150 for PMIP-based S5/S8) to pass the relevant IEs between MMEs/S4-SGSNs 142,140 and PGWs 148.

Option 2: Static configuration in MME/S4-SGSN and PGW—The MMEs/S4-SGSNs 142,140, which support the PDN connection relocation feature, should be configured with the APNs (i.e. APN-NI+APN-OI) and/or the FQDNs of the PGWs 148 that support the PDN connection relocation feature. In addition, the MMEs/S4-SGSNs 142,140 may also be configured to know when the optimized SGW restart handling is applicable for the PDN connections with PMIP-based and/or GTP-based S5/S8 interfaces. Similarly, the PGWs 148, which support the feature, should be configured with the PLMNs (i.e. MCC+MNC) and optionally the RATs (i.e., GERA, UTRA, E-UTRA) of the MMEs/S4-SGSNs 142,140 for which the feature is supported. Knowing the support level for each RAT could also be used as an indication whether MMEs 142 and/or S4-SGSNs 140 in the PLMN support the feature. The PGWs 148 may also be configured whether the optimized SGW restart handling is applicable for the PDN connections with PMIP-based S5/S8 and/or GTP-based S5/S8 for each PLMN.

In view of the 3GPP specifications requiring that PLMN change (using the GTPv2 Serving Network IE) and/or RAT change (using the GTPv2 RAT Type IE) of an active PDN connection must be communicated to the PGW 148, the PGWs 148 can always have this information up to date. Similarly, the APN and the S5/S8 protocol type of each PDN connection are always available in the MME/S4-SGSN 142,140 and the PGW 148. Therefore, based on this information per PDN connection and the static configuration, the MMEs/S4-SGSNs 142,140 and the PGWs 148 can figure out which PDN connections would be maintained upon detection of the SGW restart for SGW relocation.

Option 3: DNS based configuration in MME/S4-SGSN and PGW—This method is similar to the previous method of static configuration. However, in this case, the MME/S4-SGSN 142,140 gets the indication for the optimized SGW restart handling feature support level (i.e. by adding a new NAPTR service field) and also the applicable S5/S8 interface type (i.e. GTP and/or PMIP) of the PGW 148 from the DNS server during the APN resolution as per the procedures in TS 29.303. The APN records in the DNS server needs to be properly configured to indicate such a feature support in the PGW 148. The PGW's feature support indication may be sent to the target MME/S4-SGSN 142,140 during MME/S4-SGSN relocation as part of bearer context information, even though the target MME/S4-SGSN 142,140 is likely to populate similar information when establishing PDN connections for some other UEs 100 towards the same PGW 148.

The PGW may use DNS to find out the feature support level of the PLMN, e.g. indication of "supported" or "not_supported", and also, if "supported", the support level for each RAT and S5/S8 protocol type (i.e. GTP and/or PMIP). In this case the PGW 148 can perform proper DNS query (ies) for a PLMN, gets the relevant feature support levels for that PLMN. Any combination of this method with the previous method of static configuration could also be used. For example, the MME/S4-SGSN 142,140 may use the DNS based method while the PGW 148 may use static configuration.

Option 4: MME/S4-SGSN/SGW common support for the feature—This method could be an alternative when the PGW 148 does not support the PDN relocation feature. All SGWs 146 in an SGW service area behave as follows and MMEs/S4-SGSNs 142,140 that employ this SGW service area are aware of this behavior (i.e. the MMEs/S4-SGSNs 142,140 and the SGW 146 support this feature so there is no need to negotiate between the MME/S4-SGSN 142,140 and the SGW 146 and, instead, the feature is turned on for the SGW service area). When the SGWs 146_1 in the SGW pool 146 restarts, the SGW1 146_1 does not send an incremented Restart Counter value on GTPv2 S5/S8. For PMIP based S5/S8 the SGW1 146_1 does not reset the PCRF links. The SGW1 146_1 does not send Error Indication on S5/S8 GTPv1 user plane. Hence, the PGW 148 is unaware that the SGW1 146_1 restarted. The PGW 148 will detect some PDN connections are not valid when it sends S5/S8 messages triggered by PCRF 150 (e.g. S5/S8 Update Bearer Request, Delete Bearer Request) but the majority of PDN connections will not be impacted. The MMEs/S4-SGSNs 142,140 are aware of SGW1 146_1 restart and initiate the SGW relocation procedure explained herein.

The method of Option 1 allows the PDN relocation feature to be applicable per PDN-connection level. Because the feature support level of the MME/S4-SGSN 142,140 in use for the PDN connection is always communicated to the PGW 148 during MME/S4-SGSN relocation, different feature support levels in the MMEs/S4-SGSNs 142,140 are manageable. One of the potential drawbacks is the necessity of extra S5/S8 signalling if such signalling is not needed during inter MME/S4-SGSN intra SGW mobility. Another potential drawback is difficulty with backwards compatibility, i.e. if some MMEs/S4-SGSNs 142,140 or SGWs 146 in the network do not support the new IEs introduced with this capability exchange, or GTPv2, then the feature may become not so usable unless 3GPP introduces a new mechanism to exchange information exchange between the MMEs/S4-SGSNs 142,140 and PGWs 148.

The method of Options 2 and 3 may not have the potential drawbacks of Option 1 because they rely on the feature support in all MMEs 142 and/or S4-SGSNs 140 in the network. However, Options 2 and 3 may require some extra configuration or DNS signalling to maintain the feature support tables in MMEs/S4-SGSNs 142,140 and PGWs 148.

The method of Option 4 has a potential advantage that the PGW 148 is not required to support this feature. Because it is common for an operator to have all MMEs/S4-SGSNs 142,140 and SGWs 146 in a MME pool/SGW service area with common features, this method may be more easily implemented. No feature support indication is therefore needed if this constraint is met. A potential drawback is it may require that the SGW 146 restarts faster than the PGW's T3*N3 timer expires for S5/S8 Echo Request (or the SGW 146 would need to reply to Echo Request during the SGW restart).

For the PDN connections where PMIP-based S5/S8 is in use with dynamic policy provisioning, i.e. where the restarted SGW1 146_1 has connections with vPCRF(s) and/or hPCRF(s), if/when the PCRF detects the restart of the SGW1 146_1, it should ignore such restart indication. In other words, the vPCRF or the hPCRF should not initiate any procedure to delete an affected PDN connection towards the associated PGW 148. The PGW 148 should be able to control what PDN connections need to be deleted or kept active for the optimized SGW restart handling. If such behavior in the PCRF 150 can not be secured, the optimized SGW restart handling may exclude the PDN connections with PMIP based S5/S8.

In block 502, one or more events cause SGW1 146_1 to initiate restart operations.

The MME/S4-SGSN 142,140 checks the reachability of the peer SGWs 146, including SGW1 146_1, for which it has activated PDN connections for UEs 100. The MME/S4-SGSN 142,140 checks the reachability of the SGW (in this case, SGW1 146_1) periodically using, for example, GTPv2 Echo Request signalling so that it could get the SGW's Restart Counter value in a GTPv2 Echo Response message as soon as SGW1 146_1 becomes accessible after restarting. In block 504, the MME/S4-SGSN 142,140 detects that communications with SGW1 146_1 have failed responsive to not receiving a response from SGW1 146_1 within a threshold time.

In block 508, MME/S4-SGSN 142,140 continues to check the reachability of the SGW (in this case, SGW1 146_1) periodically using, for example, GTPv2 Echo Request signalling so that it could get the SGW's Restart Counter value in a GTPv2 Echo Response message as soon as SGW1 146_1 becomes accessible after restarting.

Upon detecting failed communications with SGW1 146_1, the MME/S4-SGSN 142,140 should start a timer, block 508, e.g. called "SGW_relocation_timer_in_MME/SGSN". In block 510, MME/S4-SGSN 142,140 marks all affected UEs' PDN connections as "to_be_SGW_relocated," and initiates relocation of the affected UEs' PDN connections to SGW2 146_2 and/or other SGWs 146 as explained above. In block 514, the SGW2 146_2 and any other SGWs 146 that receive context information from the MME/S4-SGSN 142,140 store that context information associated with the identified PDN connections and perform operations, such as those described above for FIGS. 3 and 4, to complete relocation of the identified PDN connections. The context information received by SGW2 146_2 may include, for each of the PDN connections that is to be restored through SGW2 146_2, identification of the PDN connection, an Internet Protocol address of the associated PGW 148, a tunneling identifier, a Quality of Service value, and/or a bearer ID.

The "SGW_relocation_timer_in_MME/SGSN" may be a pre-configured timer in the MME/S4-SGSN and its value may be defined by the operator based on how long it might take to perform intra MME/S4-SGSN inter SGW relocation procedures for the affected UEs. In block 516, upon expiry of the timer, the affected PDN connections, which have not been restored in SGW1 or relocated to any other SGWs yet, are deleted. The timer may be particularly useful when the MME/S4-SGSN 142,140 is not able to complete the SGW relocation due to reasons such as signalling/processor capacity limitations in the MME/S4-SGSN 142,140, SGW 146 or PGW 148, or transport network capacity limitations, etc. If an operator does not have a tight restriction on how long the SGW relocation signalling should be completed (in this case relocation signalling will most likely to be completed within duration of largest periodic TAU/RAU timer value assigned to UEs 100 based on occurrence of uplink NAS signalling), then "SGW_relocation_timer_in_MME/SGSN" can be set to a value as high as the periodic TAU/RAU timer.

A timer, e.g. called "SGW_relocation_timer_in_PGW", in the PGW 148 may also be used in block 530 for a similar purpose as the corresponding timer in the MME/S4-SGSN. Additionally, the timer in the PGW 148 can be used to ensure the clean up of the PDN connections if the MME/S4-SGSN 142,140 is not able to perform the SGW relocation (e.g. due to its restart before performing SGW relocations for some or all affected connections). The expiry of these timers in the MME/S4-SGSN 142,140 and PGW 148 should be aligned as much as possible. The values of these timers may be set based on the mechanisms described in block 500. For example, if the method of option 1 is used, the timer values can be exchanged between the MME/S4-SGSN 142,140 and the PGW 148 every time a capability exchange between the nodes for the support of the feature is performed. If options 2 or 3 are used, the timer values can be set via static configuration or via DNS signalling or a combination of both. It may be more important to include the timer in the PGW 148 than in the MME/S4-SGSN 142,140, because the timer in the PGW 148 allows clean-up of hanging PDN connections.

How long it takes for SGW1 146_1 to restart can vary depending upon the internal configuration of SGW1 146_1 and what event triggered restart. Some SGWs require at least a few minutes to complete restart procedures, however it may take much longer for a SGW to return to service after initiation of a restart. The MME/S4-SGSN 142,140 and the PGW 148 may, in some embodiments, rely on the reception of the incremented Restart Counter from SGW1 146_1 to detect when SGW1 146_1 has completed restart procedures is ready for restoration of any PDN connections. However, as explained above, in block 512 MME/S4-SGSN 142,140, as a configuration option, may start moving the PDN connections of the affected UEs 100 to other SGWs (e.g. SGW2 146_2) after it detects the failure of SGW1 146_1 or a transport link failure towards SGW1 146_1 (that prevents any signalling exchange between the MME/S4-SGSN 142, 140 and SGW1 146_1), or may start moving the PDN connections in response to a message from an operator.

After the communication link between the MME/S4-SGSN 142,140 and SGW1 146_1 again becomes available, at block 518, the MME/S4-SGSN 142,140 checks the value of the Restart Counter in the GTPv2 Echo Response message received from SGW1 146_1 to determine, at block 520, if SGW 1 146_1 has restarted and, therefore lost its PDN connection context information, or has not restarted and therefore should still have its PDN connection context information. When the value of the Restart Counter differs from the value SGW1 146_1 communicated before the communication failure, MME/S4-SGSN 142,140 may continue the SGW relocation process for the rest of the affected UEs 100.

However, in accordance with some embodiments, at block 522, when the MME/S4-SGSN 142,140 determines that SGW1 146_1 has restarted, MME/S4-SGSN 142,140 can restore at least some of the affected PDN connections back to SGW 1 146_1 which have not yet been relocated to another SGW (e.g., SGW2 146_2). In particular, MME/S4-SGSN 142,140 can communicate context information to SGW 1 146_1 for each of the PDN connections that is to be restored back to SGW 1 146_1. The context information that is received by SGW1 146_1, at block 524, may include, for each of the PDN connections that is to be restored, identification of the PDN connection, an Internet Protocol address of the associated PGW 148, a tunneling identifier, a Quality of Service value, and/or a bearer ID. SGW1 146_1 uses the received context information to restore the PDN connections through the SGW1 146_1.

Returning to block 520, when SGW1 146_1 has not changed its Restart Counter value, which means that SGW1 146_1 did not restart, the MME/S4-SGSN 142,140 stops the SGW relocation process and the PDN connections are considered to be valid and, therefore, the connections that were previously marked "to_be_SGW_relocated" in blocks 510 and 532 are now unmarked if they have not yet been relocated to SGW2 146_2. Additionally, when it is determined that SGW1 146_1 did not restart, the timers of blocks 508 and 530 are reset. Accordingly, the MMEs/S4-SGSNs 142,140 and the PGWs 148 that support the optimized SGW restart handling, may not immediately conclude that a detected communication failure with a SGW is necessarily an indication that the SGW has restarted.

For SGWs 146 that have or are expected to have longer restart duration, the operator may also inform all MMEs/S4-SGSNs 142,140 who have active PDN connections in the restarted SGW 146 (e.g. by means of an O&M server) so that they may start the SGW relocation process earlier than the reception of the Restart Counter from SGW1 146_1.

The PGW 148 also needs to check the accessibility of the peer SGWs 146 for which it has activated PDN connections for UEs 100. At block 526, the PGW 148 checks the reachability of the SGW (in this case, SGW1 146_1) periodically using GTPv2 Echo Request or PMIPv6 Heartbeat Request signalling and identifies that communications with SGW1 146_1 have failed when a response is not received within a threshold time. At block 528, the PGW 148 continues checking for the reachability of the SGW1 146_1 using GTPv2 Echo Request or PMIPv6 Heartbeat Request signalling to get the SGW's Restart Counter value in the corresponding response message as soon as SGW1 146_1 becomes accessible after completing the restart procedures.

At block 530, upon detection of the failure of SGW1, the PGW 148 can start a timer, e.g. called "SGW_relocation_timer_in_PGW". At block 532, the PGW 148 may mark all affected PDN connections as "to_be_SGW_relocated". At block 534, the PGW 148 waits for the MME/S4-SGSN 142,140 to perform the intra MME/S4-SGSN inter SGW relocation procedures to restore the PDN connections back in SGW1 146_1 and/or any other SGWs (e.g. SGW2 146_2).

The usage and the potential setting of timer "SGW_relocation_timer_in_PGW" can be as described above for block 508. While the PGW 148 has been waiting for the MME/S4-SGSN 142,140 to perform the SGW relocation/restoration for the affected PDN connections/EPS bearers, the PGW 148 should not forward any user or control plane downlink packets for those PDN connections/EPS bearers on the S5/S8 interface. The PGW 148 may buffer most recent packets (e.g. packets received in last 10 seconds) for those EPS bearers/PDN connections to be transferred after their successful relocation to SGW1 146_1 or SGW2 146_2. If a GTPv1 Error Indication (3GPP TS 29.281) message or an ICMP message for a PMIP-based S5/S8 is received on the S5/S8 interface for a bearer/PDN connection that has been marked as "to_be_SGW_relocated", the PGW 148 should not delete the corresponding bearer.

As described above, how long SGW1 146_1 remains unavailable during its restart can vary depending upon its internal configuration and what event triggered the restart. The PGW 148 may rely on the reception of the incremented Restart Counter from the SGW1 146_1 for the detection of completion of the restart. After the communication link between the PGW 148 and SGW1 146_1 becomes available, the PGW 148 checks the value of the Restart Counter in the GTPv2 Echo Response or PMIPv6 Heartbeat Response message received from SGW1: If the value of the Restart Counter differs from the value SGW1 146_1 communicated before the failure, as described in previous paragraph, the PGW 148 should start a timer, e.g. called "SGW_relocation_timer_in_PGW", and marks all affected PDN connections as "to_be_SGW_relocated", and wait for the MME/S4-SGSN to perform the SGW relocation procedures. If SGW1 146_1 has not changed its Restart Counter value, which means SGW1 146_1 has not restarted, the PDN connections that have been established via SGW1 146_1 are considered to be valid.

At block 536, when the "SGW_relocation_timer_in_PGW" timer expires, any affected PDN connections that have been marked as "to_be_SGW_relocated" but have not yet been restored to SGW1 146_1 or relocated to one or more other SGWs (e.g., SGW2 146_2) are deleted from the PGW 148. In the example operations of FIG. 5, at block 538 the PGW 148 receives an Echo response message from SGW1 146_1 responsive to an Echo request message that it communicated to SGW1 146_1, and PGW 148 determines therefore that communications have been restored to SGW1 146_1. The Echo response can contain a Restart Counter that indicates to the PGW 148 whether SGW1 146_1 has restarted. PGW 148 can then respond by resetting the relocation timer (e.g., "SGW_relocation_timer").

Although the operations of FIG. 5 for offloading PDN connections from SGW1 146_1 have been described in the context of being carried out in response to detecting a failure of communication to SGW1, in some other embodiments an operator may initiate the relocation of connections from SGW1 146_1 in response to observing that SGW1 146_1 is undergoing restart operations (e.g., restart operations are observed to be taking more than a threshold time). Moreover, in some other embodiments, the operator may initiate the relocation in response to a desire/need to offload at least some traffic from a particular SGW. Accordingly, PDN connections can be offloaded from a SGW in response to events that can include, but are not limited to, a serving gateway support node detecting a failure of communications to the SGW, a command from an operator who has observed that the SGW is undergoing restart, and/or a command from an operator who desires/needs to offload at least some traffic from a particular SGW.

Figure 6:
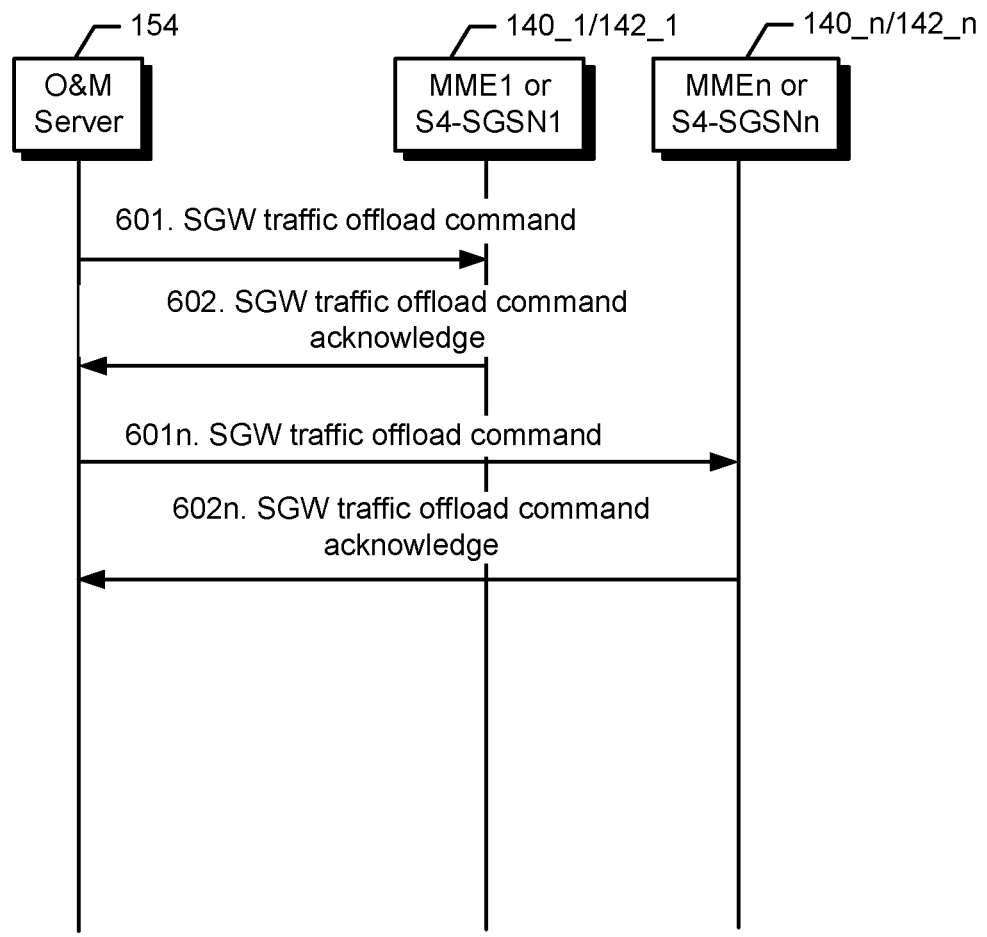
FIG. 6 illustrates a diagram of further operations, methods and associated message flows for an operator initiated relocation of connections through a SGW according to some embodiments.

FIG. 6 illustrates a diagram of further operations, methods and associated message flows for an operator initiated relocation of connections through SGWs 146 according to some embodiments. Referring to FIG. 6, the O&M server 154 instructs the MMEs/S4-SGSNs 142,140 to offload traffic that uses a specific SGW 146. These commands may also be provided to the associated MMEs/S4-SGSNs 142,140 via their command line interfaces.

The O&M server 154 sends a command 601,601*n* to each MME/S4-SGSN 142,140 (e.g., MME1/S4-SGSN1 and MMEn/S4-SGSNn) that may currently use a specified SGW 146 from which traffic will be offloaded. The command can contain the node FQDN and/or the S11/S4 GTPv2-C Tunnel IP addresses of the specified SGW 146. The command may also contain the completion time/duration to offload the traffic or the time or duration after when the MME/S4-SGSN 142,140 may start reselecting the SGW 146 for new traffic. If some other criteria are chosen for the traffic offload on the SGW 146, relevant parameters can be provided to the MMEs/S4-SGSNs 142,140.

MME1/S4-SGSN1 and MMEn/S4-SGSNn receives the command for SGW traffic offload and may send an acknowledgement message 602,602*n*, respectively, to the O&M server 154 that indicates the command has been received. The MME1/S4-SGSN1 and MMEn/S4-SGSNn also starts performing the SGW relocation procedure for some or all UEs 100 based on the offload criteria received in the command.

Operations and Methods for Relocating and Restoring Connections:

Various operations and methods that are performed by a serving gateway support node, a serving gateway, and a packet gateway, to carry out and support relocation of connects from one serving gateway to another and to further support relocations of connections back to a serving gateway will now be described below with regard to FIGS. 7-17.

FIGS. 7-13 are flowcharts of operations and methods by a serving gateway support node (MME/S4-SGSN 142,140) for controlling connections that pass through at least one SGW 146_1 . . . 146_*n* of a radio telecommunications network.

Figure 7:
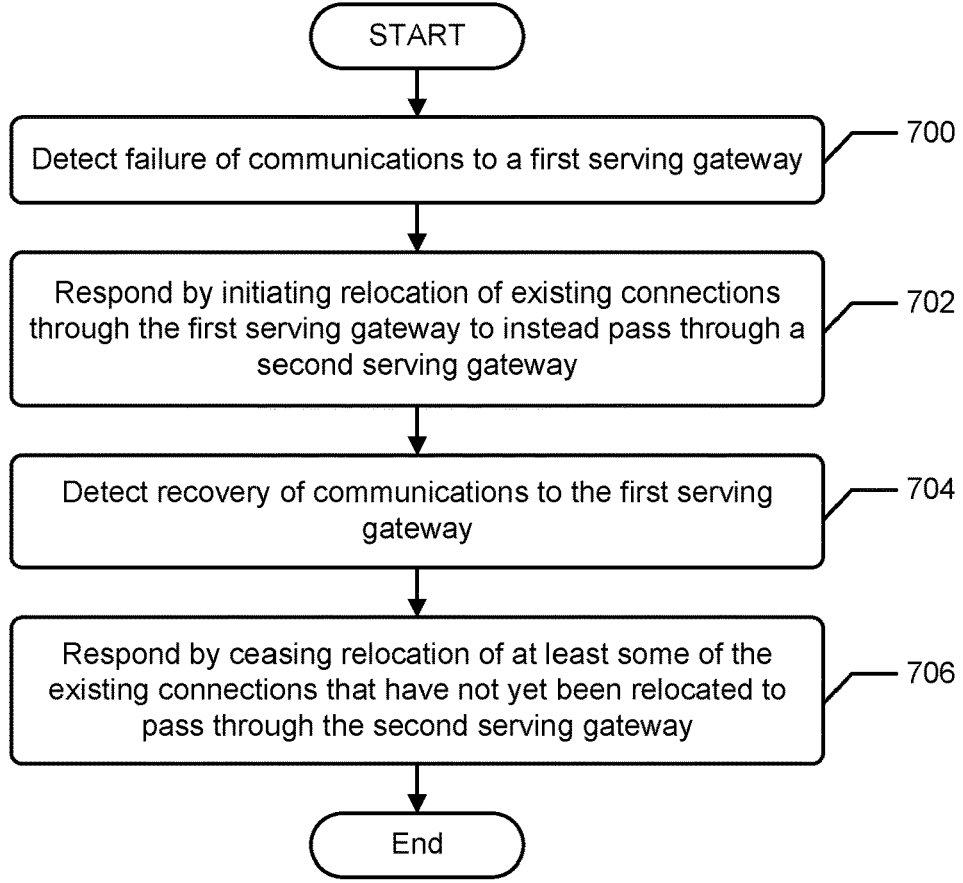
FIGS. 7-13 are flowcharts of operations and methods by a serving gateway support node for relocating connections between SGWs and restoring connections to a SGW according to some embodiments.

Referring to FIG. 7, the serving gateway support node (MME/S4-SGSN 142,140) detects (block 700) failure of communications to a first serving gateway 146_1. The serving gateway support node responds (block 702) to the detected failure by the serving gateway support node initiating relocation of existing connections through the first serving gateway 146_1 to instead pass through a second serving gateway 146_2. The serving gateway support node subsequently detects (block 704) recovery of communications to the first serving gateway 146_1, and responds to the detected recovery by ceasing relocation (block 706) of at least some of the existing connections that have not yet been relocated to pass through the second serving gateway 146_2.

Figure 8:
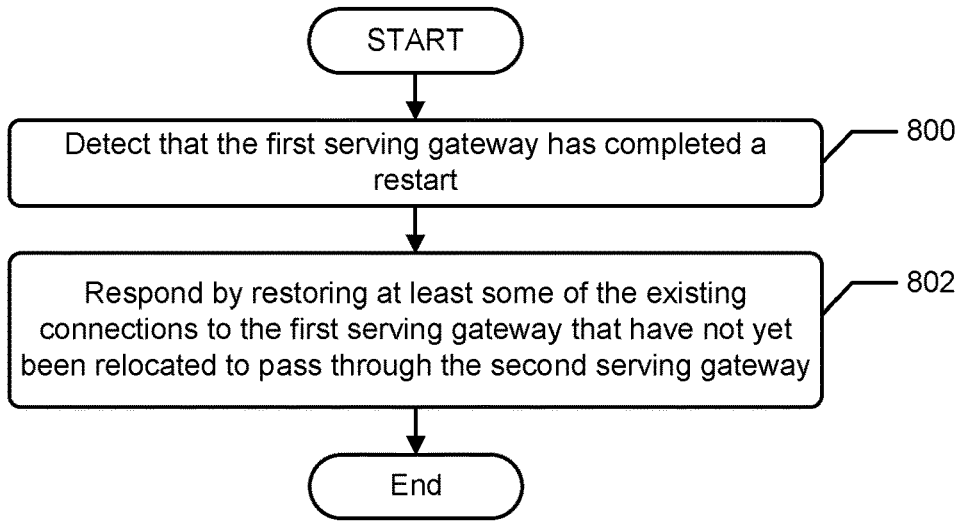

Referring to FIG. 8, the serving gateway support node may detect (block 800) that the first serving gateway 146_1 has completed a restart. The serving gateway support node may then respond to the detected restart by restoring (block 802) at least some of the existing connections to the first serving gateway 146_1 that have not yet been relocated to pass through the second serving gateway 146_2.

Figure 9:
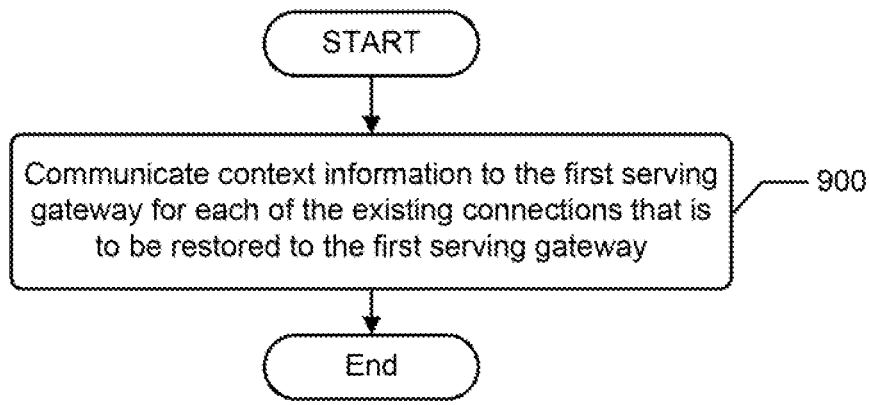

Referring to FIG. 9, the serving gateway support node may restore at least some of the existing connections to the first serving gateway 146_1 by communicating (block 900) context information to the first serving gateway 146_1 for each of the existing connections that is to be restored to the first serving gateway 146_1. The communicated context information may include identification of the connection, an Internet Protocol address of a packet gateway, a tunneling identifier, a Quality of Service value, and/or a bearer ID.

Figure 10:
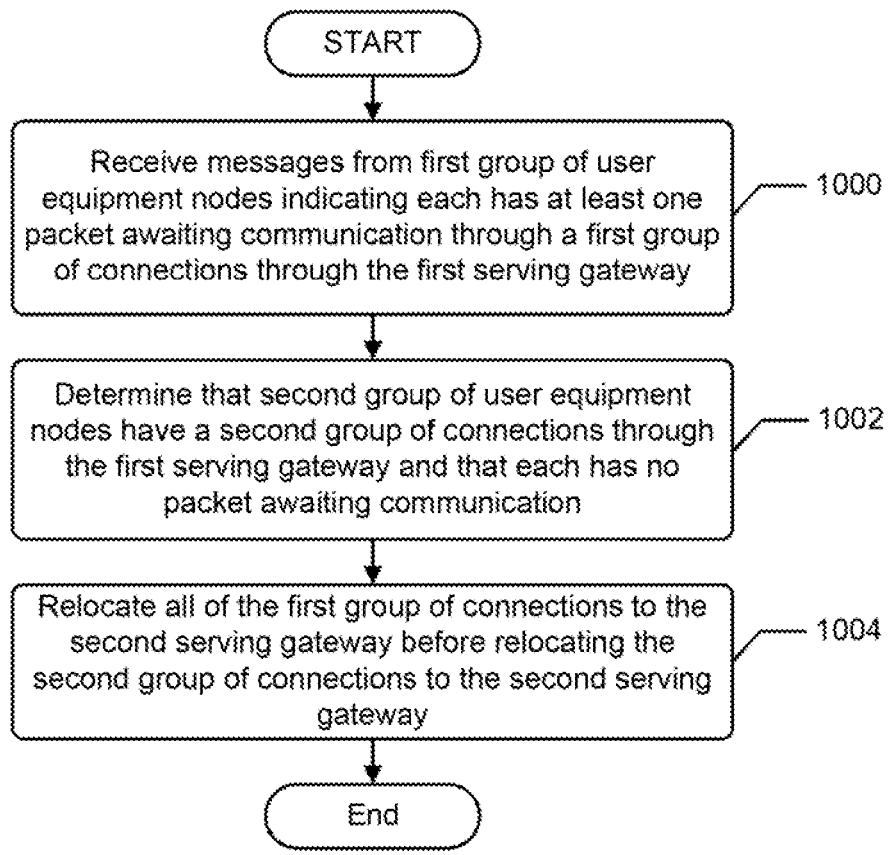

Referring to FIG. 10, the serving gateway support node may receive (block 1000) messages from a first group of user equipment nodes UEs 100 indicating that they each have at least one packet awaiting communication through a first group of connections through the first serving gateway 146_1. The serving gateway support node may also determine (block 1002) that a second group of user equipment nodes UEs 100 have a second group of connections through the first serving gateway 146_1 and that each of the second group of user equipment nodes UEs 100 has no packet awaiting communication. The serving gateway support node may respond (block 1004) by relocating all of the first group of connections to the second serving gateway 146_2 before relocating the second group of connections to the second serving gateway 146_2. Accordingly, relocation of the first group of connections can be carried out a higher priority than relocation of the second group of connections.

Figure 11:
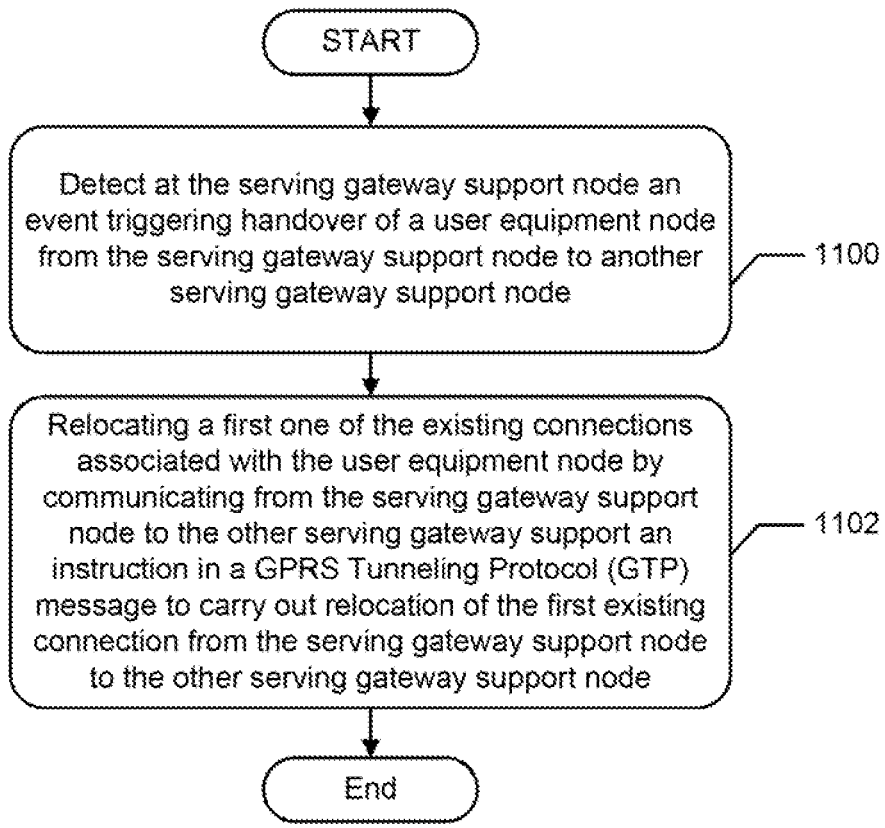

Referring to FIG. 11, the serving gateway support node (e.g., S4-SGSN 140_1) may detect (block 1100) an event that triggers handover of a user equipment node UE 100, which has not yet been relocated to the second serving gateway 146_2, from the serving gateway support node (e.g., S4-SGSN 140_1) to another serving gateway support node (e.g., S4-SGSN 140_2). The detected event may, for example, correspond to a tracking area update, or a routing area update signalling. The serving gateway support node (e.g., S4-SGSN 140_1) may respond thereto by relocating (block 1102) a first one of the existing connections associated with the user equipment node UE 100 by communicating from the serving gateway support node (e.g., S4-SGSN 140_1) to the other serving gateway support (e.g., S4-SGSN 140_2) an instruction in a GPRS Tunneling Protocol (GTP) message to carry out relocation of the first existing connection from the serving gateway support node (e.g., S4-SGSN 140_1) to the other serving gateway support node (e.g., S4-SGSN 140_2).

Figure 12:
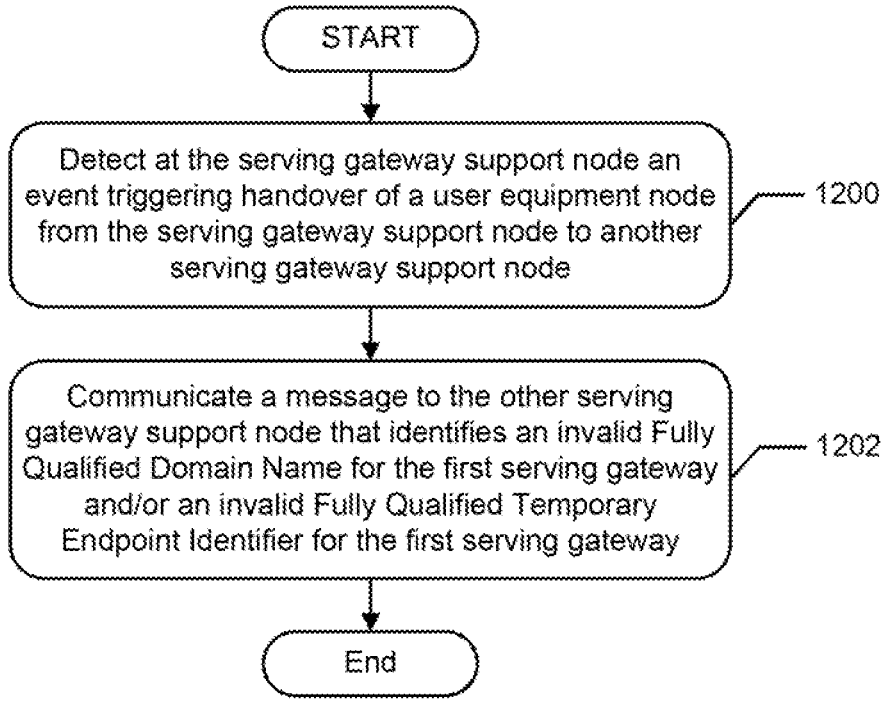

Referring to FIG. 12, the serving gateway support node (e.g., S4-SGSN 140_1) may detect (block 1200) an event that triggers handover of a user equipment node UE 100, which has not yet been relocated to the second serving gateway 146_2, from the serving gateway support node (e.g., S4-SGSN 140_1) to another serving gateway support node (e.g., S4-SGSN 140_2). The serving gateway support node (e.g., S4-SGSN 140_1) may respond thereto by communicating (block 1202) a message to the other serving gateway support node (e.g., S4-SGSN 140_2) that identifies an invalid Fully Qualified Domain Name for the first serving gateway, an invalid Fully Qualified Temporary Endpoint Identifier for the first serving gateway, or another indicator that relocation of connections to a serving gateway is needed. The message can thereby cause the other serving gateway support node (e.g., S4-SGSN 140_2) to select a third serving gateway 146_3 from among a group of serving gateways (e.g., 146_1 . . . 146_*n*) that it knows exists and to relocate the first existing connection to pass through the third serving gateway 146_3. The third serving gateway 146_3 may correspond to the first serving gateway 146_1, the second serving gateway 146_2, or another serving gateway.

Figure 13:
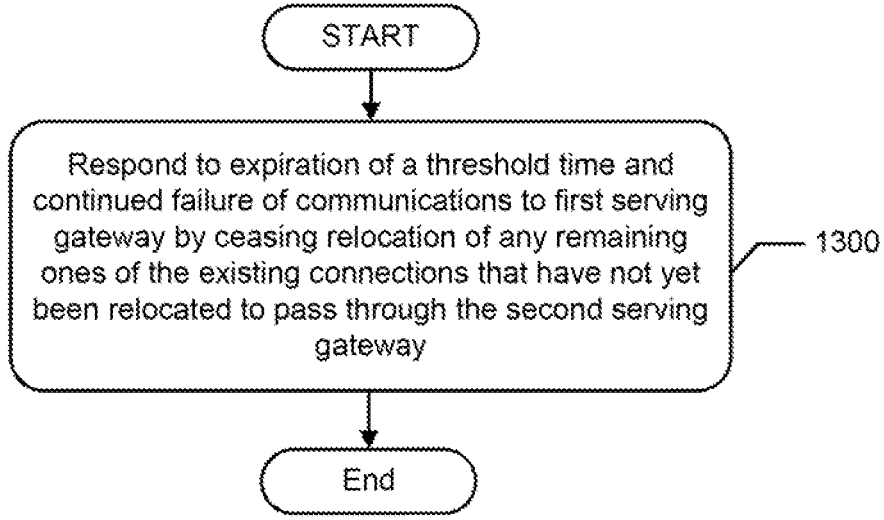

Referring to FIG. 13, the serving gateway support node may respond (block 1300) to expiration of a threshold time since having started relocation of the existing connections and a continuing failure of communications to the first serving gateway 146_1, by ceasing relocation of any remaining ones of the existing connections that have not yet been relocated to pass through the second serving gateway 146_2.

Figure 14:
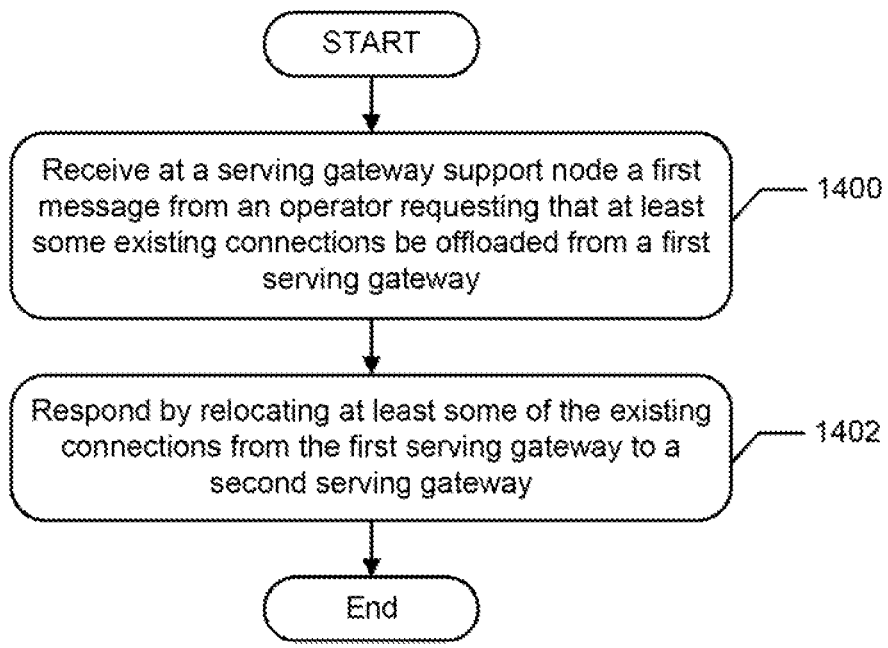
FIGS. 14-15 are flowcharts of operations and methods by a serving gateway support node for relocating connections between SGWs and restoring connections to a SGW responsive to operator initiated traffic offloading according to some embodiments.
Figure 15:
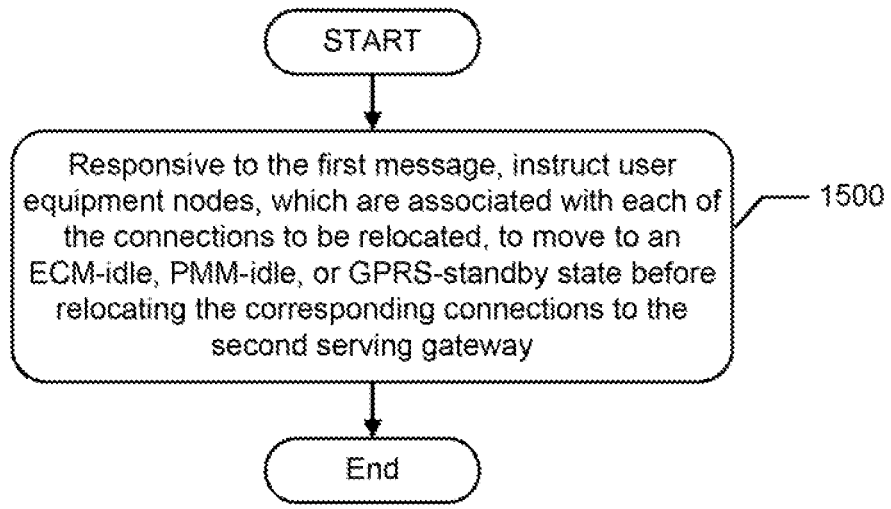

FIGS. 14-15 are flowcharts of operations and methods by a serving gateway support node, such as MME/S4-SGSN 142,140, for controlling connections that pass through at least one serving gateway 146_1 . . . 146_*n* of a radio telecommunications network responsive to operator initiated traffic offloading according to some embodiments.

Referring to FIG. 14, the serving gateway support node receives (block 1400) from an operator (e.g., via the O&M Server 154) a first message requesting that at least some connections be offloaded from a first serving gateway 146_1. The serving gateway support node responds (block 1402) to the first message by relocating at least some of the connections from the first serving gateway 146_1 to a second serving gateway 146_2.

Referring to FIG. 15, the serving gateway support node responds (block 1500) to the first message by instructing user equipment nodes (UEs 100), which are associated with each of the connections to be relocated, to move to an ECM-idle, PMM-idle, or GPRS-standby state (to release any active radio bearers) before the serving gateway support node relocates the corresponding connections to the second serving gateway 146_2.

In some embodiments, relocation of at least some of the connections from the first serving gateway to a second serving gateway in block 1402 of FIG. 14, can include relocating existing connections for a user equipment node, which is active in an Idle state Signalling Reduction (ISR) mode and is registered with both a S4-based Serving GPRS Support Node (S4-SGSN) and a Mobility Management Entity (MME) at a same time, by transferring context information for the first serving gateway through a S3 message from one of the S4-SGSN and MME to the other one of the S4-SGSN and MME.

Figure 16:
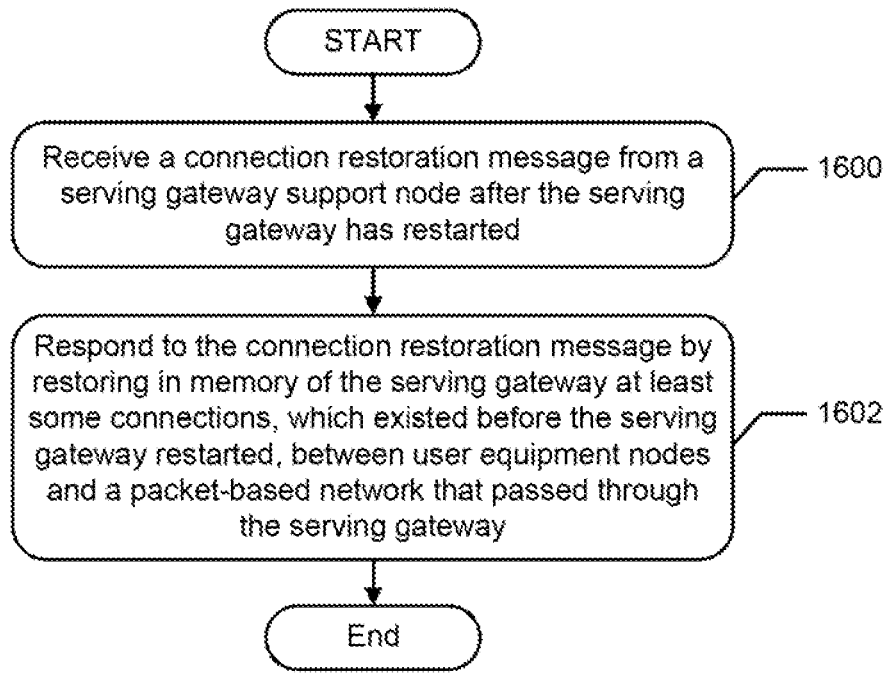
FIG. 16 is a flowchart of operations and methods by a serving gateway to support relocation and restoration of connections by a serving gateway support node according to some embodiments.

FIG. 16 is a flowchart of operations and methods by a serving gateway 146_1 to support relocation and restoration of connections by a serving gateway support node (MME/S4-SGSN 142,140) according to some embodiments. The serving gateway 146_1 receives (block 1600) a connection restoration message from the serving gateway support node after the serving gateway 146_1 has restarted. The serving gateway 146_1 responds (block 1602) to the connection restoration message by restoring in memory of the serving gateway 146_1 at least some connections, which existed before the serving gateway 146_1 restarted, between user equipment nodes UEs 100 and a packet-based network 148 that passed through the serving gateway 146_1.

The serving gateway 146_1 may respond to the connection restoration message by restoring context information in its local memory for each of the existing connections that is to be restored. The context information may include identification of the connection, an Internet Protocol address of a packet gateway, a tunneling identifier, and/or a Quality of Service value. The serving gateway 146_1 can then restore each of those connections to transport communications between various UEs 100 and the packet gateway 148 through the serving gateway 146_1.

The serving gateway 146_1 may be configured to selectively not report to the packet gateway 148 that it has restarted in response to another message from the serving gateway support node that indicates that the serving gateway support node will attempt to restore connections after the serving gateway 146_1 restarts.

Figure 17:
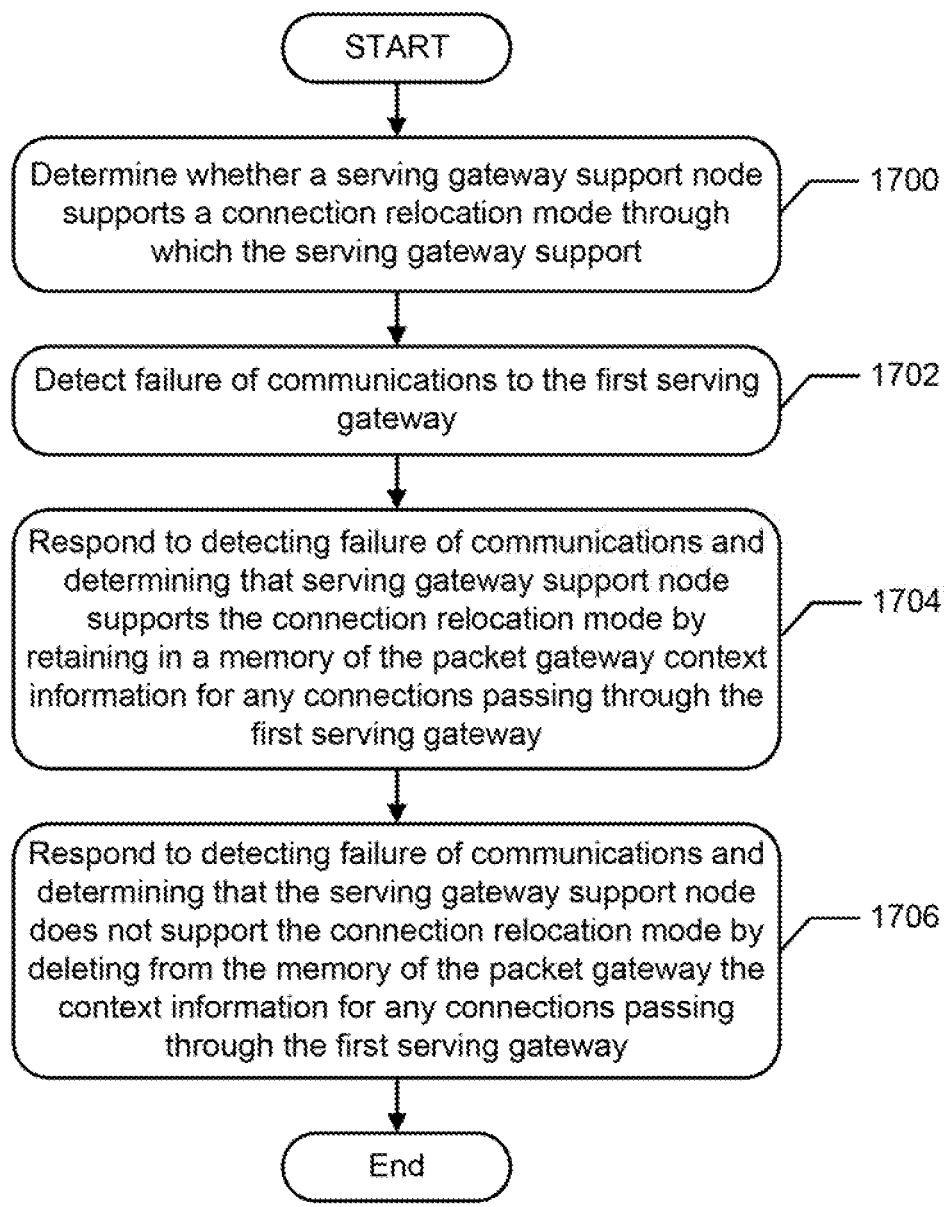
FIG. 17 is a flowchart of operations and methods by a packet gateway to support relocation of connections by a serving gateway support node according to some embodiments.

FIG. 17 is a flowchart of operations and methods by a packet gateway 148 to support relocation of connections by a serving gateway support node (MME/S4-SGSN 142,140) according to some embodiments. The packet gateway 148 determines (block 1700) whether a serving gateway support node (MME/S4-SGSN 142,140) supports a connection relocation mode through which the serving gateway support node relocates connections from a first serving gateway 146_1 of a radio telecommunications network to a second serving gateway 146_2 in response to the serving gateway support node detecting failure of communications to the first serving gateway 146_1. The packet gateway 148 detects (block 1702) failure of communications to the first serving gateway 146_1. The packet gateway 148 responds (block 1704) to the detected failure of communications to the first serving gateway 146_1 and to determining that the serving gateway support node supports the connection relocation mode by retaining in a memory of the packet gateway 148 context information for any connections that the packet gateway 148 has that pass through the first serving gateway 146_1. The packet gateway 148 responds (block 1706) to the detected failure of communications to the first serving gateway and to determining that the serving gateway support node does not support the connection relocation mode by deleting from the memory of the packet gateway 148 the context information for any connections that the packet gateway has that pass through the first serving gateway 146_1.

The packet gateway 148 may be further configured to detect failure of communications to the first serving gateway 146_1 by detecting when the first serving gateway 146_1 has restarted. The packet gateway 148 may respond to detecting that the first serving gateway 146_1 has restarted and to determining that the serving gateway support node supports the connection relocation mode by retaining in the memory of the packet gateway 148 the context information for any connections that the packet gateway 148 has that pass through the first serving gateway 146_1. The packet gateway 148 may respond to detecting that the first serving gateway 146_1 has restarted and to determining that the serving gateway support node does not support the connection relocation mode by deleting from the memory of the packet gateway 148 the context information for any connections that the packet gateway 148 has that pass through the first serving gateway 146_1.

Figure 18:
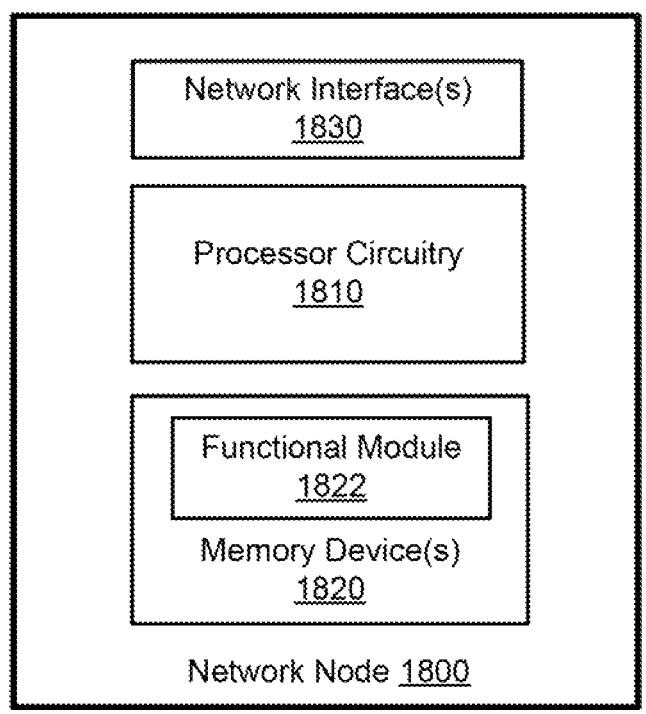
FIG. 18 is a block diagram of an example network node of FIG. 1 that is configured according to some embodiments.

FIG. 18 is a block diagram of a network node 1800 that is configured according to some embodiments. The network node 1800 which may be used in one or more of the network nodes of FIG. 1, including, but not limited to, the S4-SGSN 140, the MME 142, the SGW 146, the PGW 148, the PCRF 150, the HSS 144, the O&M Server 154, and/or the UE 100. The network node 1800 can include one or more network interfaces 1830, processor circuitry 1810, and memory circuitry/devices 1820 that contain functional modules 1822.

The processor circuitry 1810 may include one or more data processing circuits, such as a general purpose and/or special purpose processor (e.g., microprocessor and/or digital signal processor). The processor circuitry 1810 is configured to execute computer program instructions from the functional modules 1822 in the memory circuitry/devices 1820, described below as a computer readable medium, to perform some or all of the operations and methods that are described above for one or more of the embodiments, such as the embodiments of FIGS. 1-17. Accordingly, the processor circuitry 1810 can be configured by execution of the computer program instructions in the functional modules 1822 to carry out at least some of the functionality described herein to support relocation and restoration of connections through SGW in a radio telecommunications network.

Abbreviations:

A list of abbreviations used in the present disclosure is provided below for ease of reference of the reader:

3GPP Third Generation Partnership Project
APN Access Point Name
APN-NI APN Network Identifier
APN-OI APN Operator Identifier CDR Charging Data Record
DHCP Dynamic Host COnfiguration Protocol
DNS Domain Name System
eNodeB E-UTRAN NodeB
EPC Evolved Packet COre
EPS Evolved Packet System
E-UTRA Evolved Universal Terrestrial Radio Access
E-UTRAN Evolved Universal Terrestrial Radio Access Network
FQDN Fully Qualified Domain Name
F-TEID Fully Qualified Temporary Endpoint Identifier
GERA GSM EDGE Radio Access
GERAN GSM EDGE Radio Access Network
Gn/Gp SGSN SGSN with Gn/Gp interface
GTP GPRS Tunnelling Protocol
GTPv2 GTP Version 2
GTPv2-C GTPv2 Control Plane
HO Handover
hPCRF Home PCRF
HSS Home Subscriber Server
IE Information Element
IMS IP Multimedia Subsystem
ISR Idle state Signalling Reduction
MM Mobility Management
MME Mobility Management Entity
MCC Mobile Country Code
MNC Mobile Network Code
NAS Non-Access Stratum
P-CSCF Proxy Call Session Control Function
PCRF Policy and Charging Rules Function
PDN Packet Data Network
PDP Packet Data Protocol
PGW Packet GateWay
PLMN Public Land Mobile Network
PMIP/PMIPv6 Proxy Mobile IP version 6
PS Packet Switched
RNC Radio Network Controller
QoS Quality of Service
RADIUS Remote Authentication Dial In User Service
RAU Routing Area Update
S4-SGSN SGSN with S4-interface
SGSN Serving GPRS Support Node
SGW Serving GateWay
SMS Short Message Service
TAU Tracking Area Update
UE User Equipment
UTRA UMTS Terrestrial Radio Access
UTRAN UMTS Terrestrial Radio Access Network
VoLTE Voice Over LTE
vPCRF Visited PCRF In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method performed at a serving gateway support node in a radio telecommunications network, wherein the serving gateway support node including at least one of a mobility management entity (MME) or a serving General Packet Radio Service support node (SGSN), the method comprising:
    detecting that a serving gateway has failed;
    maintaining, for a duration of time, a connection corresponding to the serving gateway;
    receiving a General Packet Radio Service Tunneling Protocol (GTP) message from the serving gateway, the GTP message including a restart counter value that has been incremented;
    detecting, based on the incremented restart counter value, a restart of the serving gateway;
    restoring the connection to the serving gateway; and
    after expiration of the duration of time, deleting a serving gateway connection that has not been restored.

2. The method of claim 1, wherein the connection comprises a packet data network (PDN) connection.

3. The method of claim 1, wherein the GTP message comprises an echo response to an echo request message from the serving gateway support node.

4. The method of claim 1, wherein the restoring includes the serving gateway support node providing context information to the serving gateway.

5. The method of claim 4, wherein the context information includes an Internet Protocol address of a packet gateway, a tunneling identifier, a quality of service value, and a bearer identifier.

6. A system including a serving gateway support node in a radio telecommunications network, wherein the serving gateway support node includes at least one of a mobility management entity (MME) or a serving General Packet Radio Service support node (SGSN), the system comprising:
    a non-transitory computer-readable medium having instructions stored thereon; and
    processor circuitry coupled to the non-transitory computer-readable medium, the processor circuitry to execute the instructions to cause the processor circuitry to perform operations comprising:
    detecting that a serving gateway has failed;
    maintaining, for a duration of time, a connection corresponding to the serving gateway;
    receiving a General Packet Radio Service Tunneling Protocol (GTP) message from the serving gateway, the GTP message including a restart counter value that has been incremented;
    detecting, based on the incremented restart counter value, a restart of the serving gateway;
    restoring the connection to the serving gateway; and
    after expiration of the duration of time, deleting a serving gateway connection that has not been restored.

7. The system of claim 6, wherein the connection comprises a packet data network (PDN) connection.

8. The system of claim 6, wherein the GTP message comprises an echo response to an echo request message from the serving gateway support node.

9. The system of claim 6, wherein the restoring comprises the serving gateway support node providing context information to the serving gateway, the context information including one or more of: an Internet Protocol address of a packet gateway; a tunneling identifier; a quality of service value; or a bearer identifier.

10. A non-transitory computer-readable medium having stored thereon instructions, which when executed by a serving gateway support node including at least one of a mobility management entity (MME) or a serving General Packet Radio Service support node (SGSN) cause the serving gateway support node to perform operations comprising:
    detecting that a serving gateway has failed;
    maintaining, for a duration of time, a packet data network (PDN) connection corresponding to the serving gateway;
    receiving a General Packet Radio Service Tunneling Protocol (GTP) message from the serving gateway, the GTP message including a restart counter value that has been incremented;
    detecting, based on the incremented restart counter value, a restart of the serving gateway;

restoring the PDN connection to the serving gateway; and after expiration of the duration of time, deleting a serving gateway connection that has not been restored.

11. The non-transitory computer-readable medium of claim 10, wherein the GTP message comprises an echo response to an echo request message from the serving gateway support node.

12. The non-transitory computer-readable medium of claim 10, wherein the restoring comprises the serving gateway support node providing context information to the serving gateway, the context information comprising an Internet Protocol address of a packet gateway, a tunneling identifier, a quality of service value, and a bearer identifier.

* * * * *